(12) United States Patent
Bruneau

(10) Patent No.: US 12,441,211 B2
(45) Date of Patent: Oct. 14, 2025

(54) SYSTEM AND METHOD FACILITATING TRAVEL OF AN ELECTRIC OFF-ROAD VEHICLE ON AN UNCHARTED ROUTE

(71) Applicant: TAIGA MOTORS INC., Lasalle (CA)

(72) Inventor: Samuel Bruneau, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 345 days.

(21) Appl. No.: 17/901,201

(22) Filed: Sep. 1, 2022

(65) Prior Publication Data

US 2023/0117358 A1   Apr. 20, 2023

Related U.S. Application Data

(60) Provisional application No. 63/336,366, filed on Apr. 29, 2022, provisional application No. 63/255,518, filed on Oct. 14, 2021.

(51) Int. Cl.

| | | |
|---|---|---|
| G01C 21/00 | (2006.01) | |
| B60L 58/12 | (2019.01) | |
| G01C 21/20 | (2006.01) | |
| G07C 5/00 | (2006.01) | |
| B62M 27/02 | (2006.01) | |

(52) U.S. Cl.
CPC ............ *B60L 58/12* (2019.02); *G01C 21/005* (2013.01); *G01C 21/20* (2013.01); *G07C 5/008* (2013.01); *B62M 27/02* (2013.01)

(58) Field of Classification Search
CPC .............................. B60L 58/12; G01C 21/005
See application file for complete search history.

(56) References Cited

U.S. PATENT DOCUMENTS

| | | |
|---|---|---|
| 9,221,355 B2 | 12/2015 | Kuhn et al. |
| 9,644,969 B2 * | 5/2017 | Koenig ................... B60K 37/00 |
| 9,709,412 B2 * | 7/2017 | Yamada ................... B60L 53/00 |
| 9,776,528 B2 | 10/2017 | Konet et al. |
| 10,139,245 B2 | 11/2018 | Adachi et al. |
| 10,859,391 B2 | 12/2020 | Beaurepaire et al. |
| 10,967,875 B2 | 4/2021 | VanLandingham et al. |
| 2013/0024112 A1 | 1/2013 | Tate, Jr. |
| 2016/0003621 A1 * | 1/2016 | Koenig ................... B60K 35/90 |
| 2016/0061610 A1 * | 3/2016 | Meyer ..................... B60L 58/12 |
| | | 701/22 |

(Continued)

FOREIGN PATENT DOCUMENTS

WO    2015/153140 A1    10/2015

*Primary Examiner* — Jess Whittington
(74) *Attorney, Agent, or Firm* — Norton Rose Fulbright Canada LLP

(57) ABSTRACT

Systems and methods for facilitating travel of an electric off-road vehicle on an uncharted off-road route are provided. A method includes relating the uncharted off-road route to be travelled by the electric off-road vehicle to map data of a geographic area including the uncharted off-road route. Using the map data, one or more geographic characteristics of the uncharted off-road route are determined. Using the one or more geographic characteristics of the uncharted off-road route and predetermined battery consumption data associated with the one or more geographic characteristics, an estimated battery consumption for the electric off-road vehicle to travel the uncharted off-road route is determined. The estimated battery consumption is communicated to an operator of the electric off-road vehicle.

20 Claims, 16 Drawing Sheets

(56) References Cited

U.S. PATENT DOCUMENTS

| | | |
|---|---|---|
| 2018/0222309 A1 | 8/2018 | Follen et al. |
| 2020/0117204 A1* | 4/2020 | Lindemann ............. B60L 53/63 |
| 2021/0129827 A1 | 5/2021 | Light-Holets et al. |
| 2021/0138927 A1* | 5/2021 | Maeng .................... B60L 58/16 |
| 2022/0176939 A1* | 6/2022 | Poll ....................... B60W 10/26 |

* cited by examiner

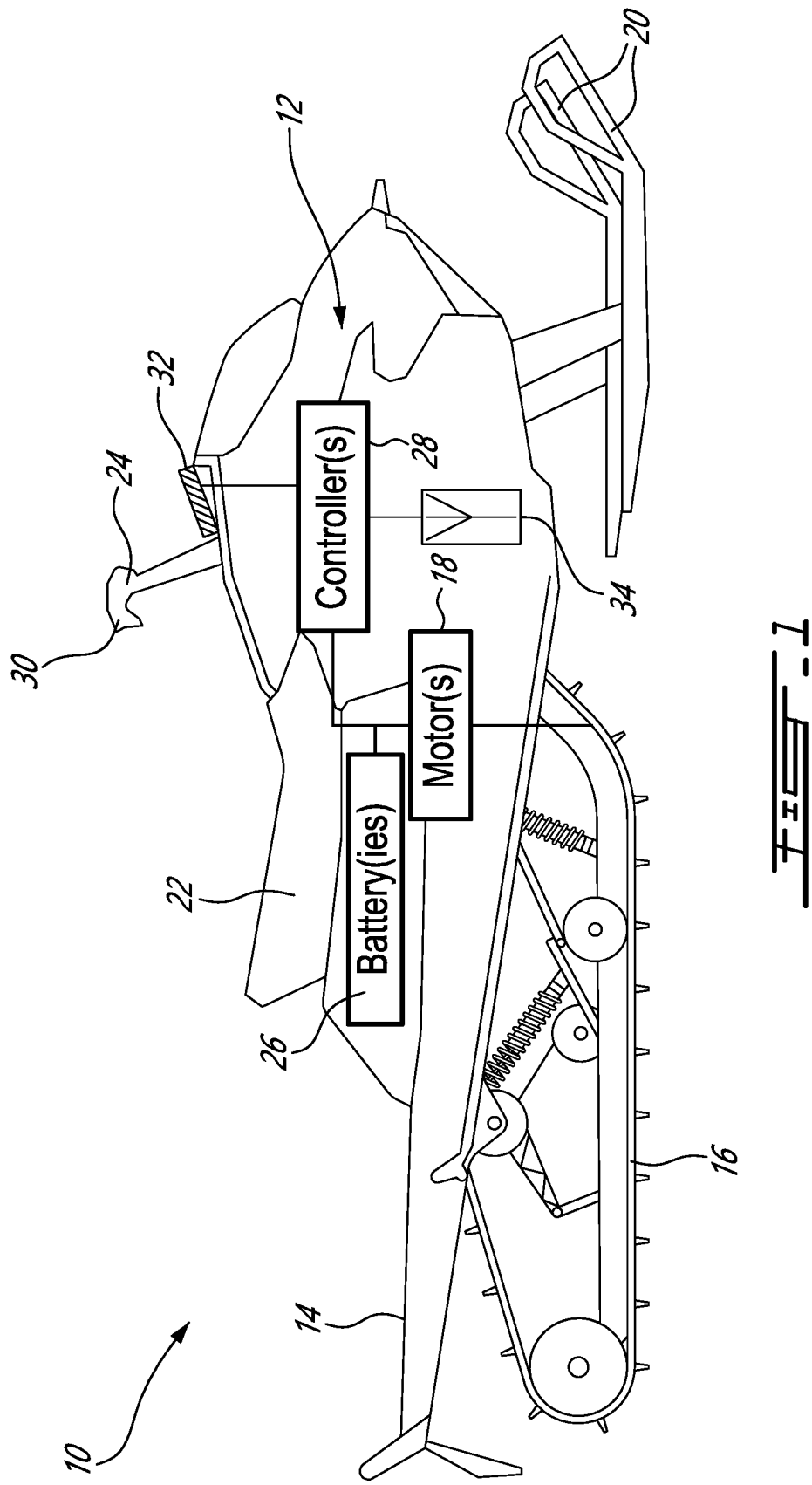

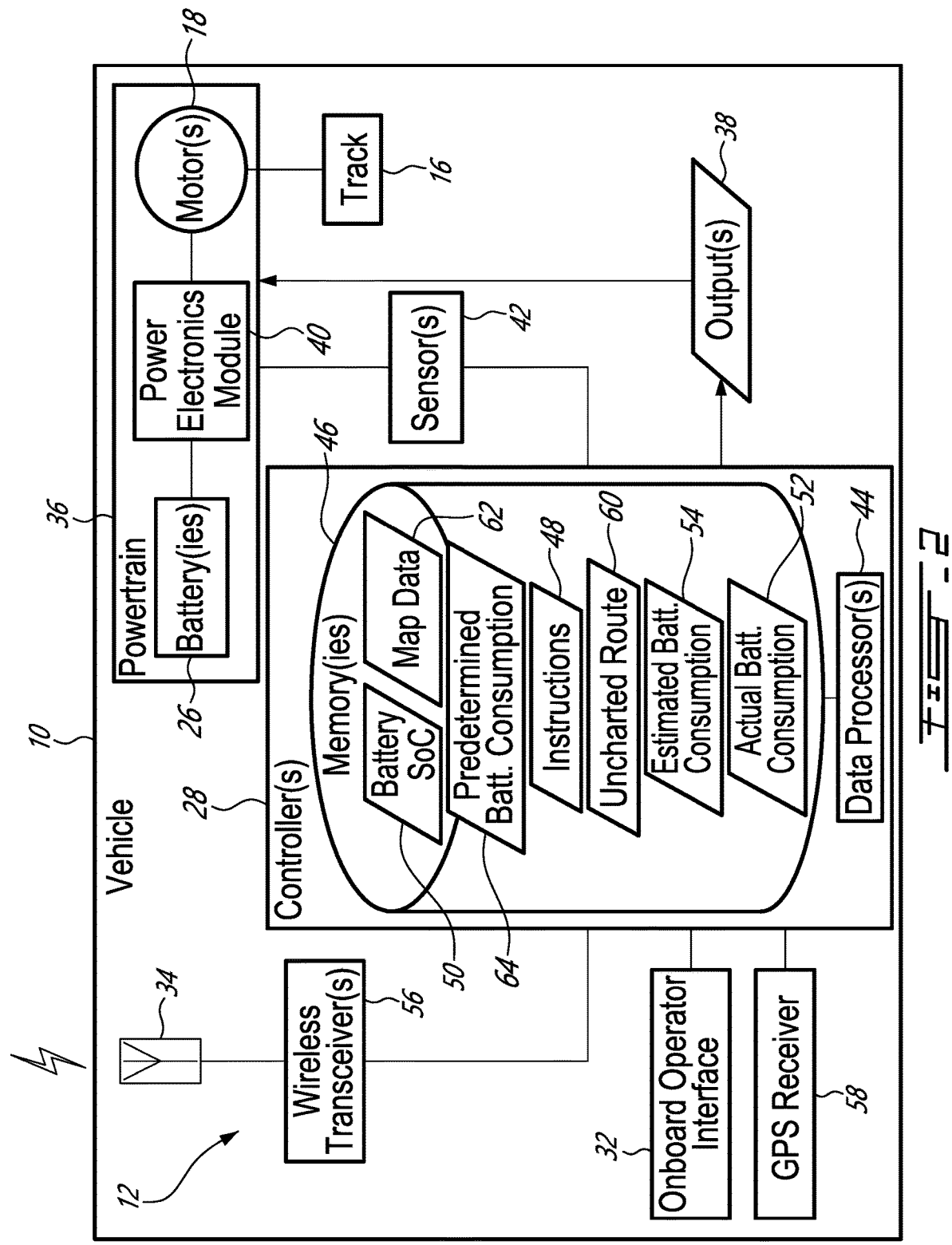

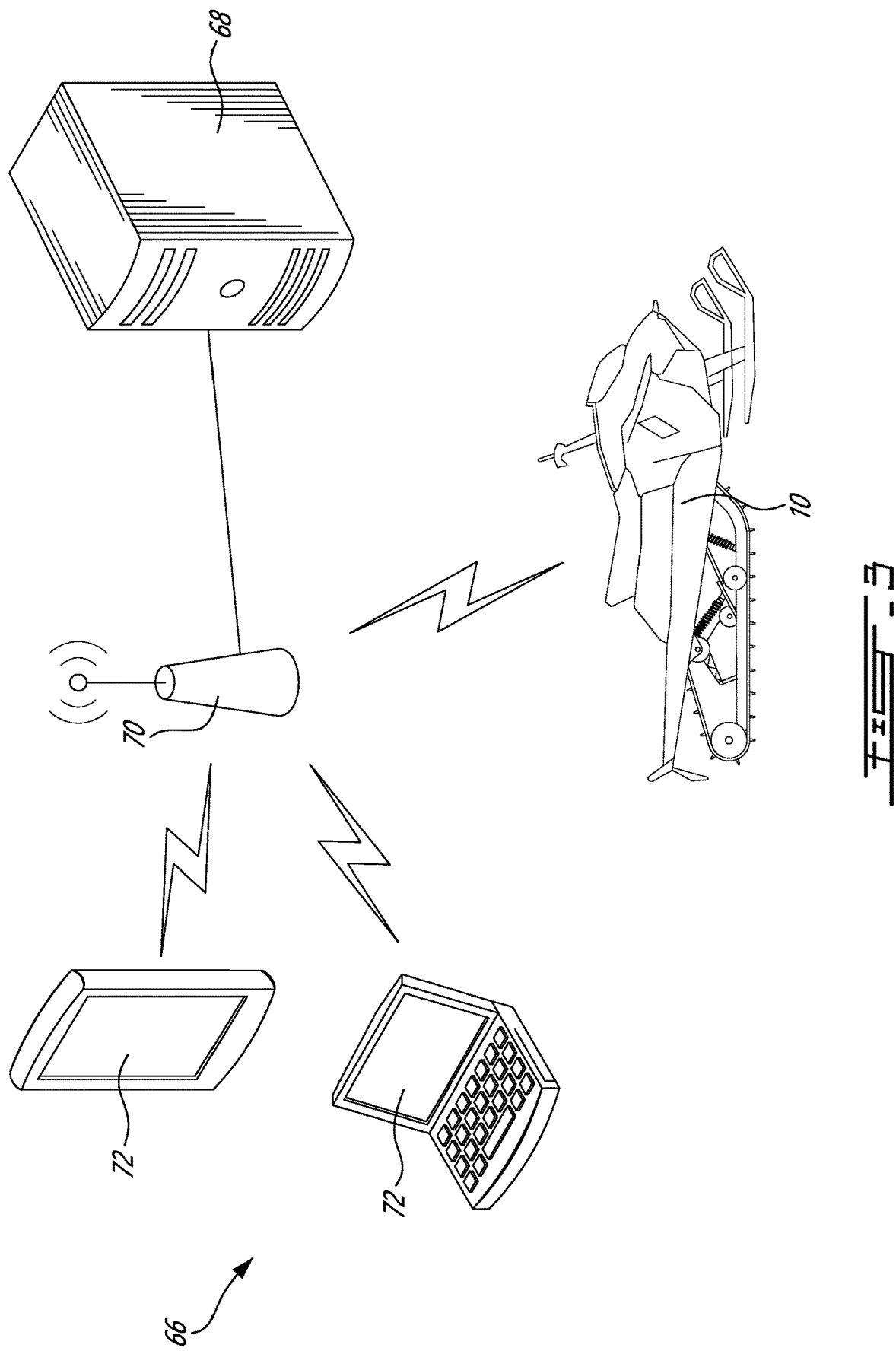

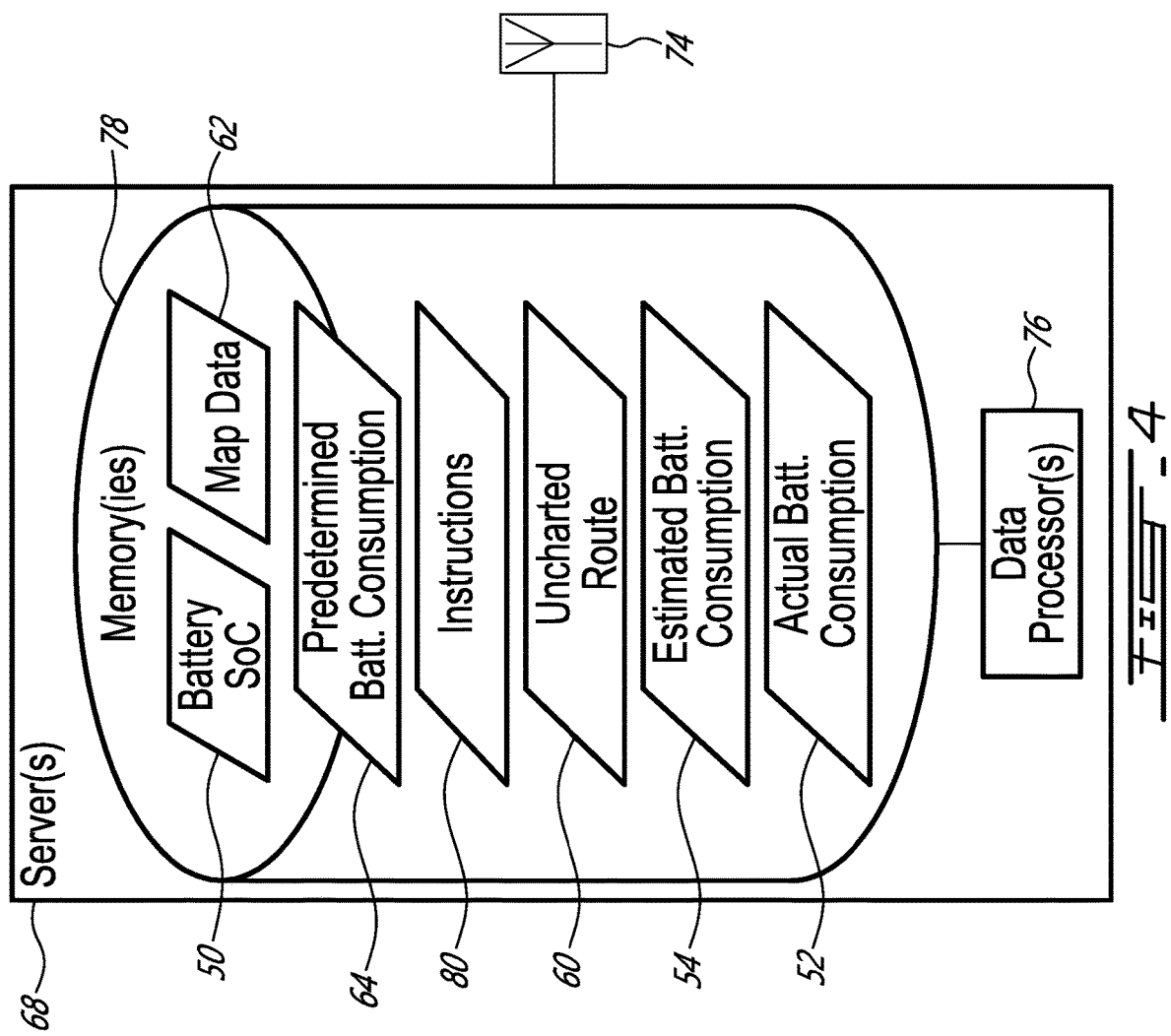

| Vehicle Type | Operating Conditions | | | | Battery Consumption Value |
|---|---|---|---|---|---|
| | Topography | Terrain Condition | Vehicle Loading | Speed | |
| Snowmobile | Decline | Snow | Heavy | Fast | SoC1/km |
| Snowmobile | Level | Snow | Heavy | Fast | SoC2/km |
| Snowmobile | Incline | Snow | Heavy | Fast | SoC3/km |
| Snowmobile | Decline | Ice | Medium | Slow | SoC4/km |
| Snowmobile | Level | Ice | Medium | Slow | SoC5/km |
| Snowmobile | Incline | Ice | Medium | Slow | SoC6/km |
| ATV | Decline | Grass | Light | Moderate | SoC7/km |
| ATV | Level | Grass | Light | Moderate | SoC8/km |
| ATV | Incline | Grass | Light | Moderate | SoC9/km |
| ... | | | | | ... |

FIG-5

| Vehicle Type | Obstacle Type | Criteria |
|---|---|---|
| Snowmobile | Steep Incline | ECO: Slope > S1<br>NORMAL: Slope > S2 (S2 > S1)<br>SPORT: Slope > S3 (S3 > S2) |
| Snowmobile | Steep Decline | ECO: Slope < S4<br>NORMAL: Slope < S5 (S5 < S4)<br>SPORT: Slope < S6 (S6 < S5) |
| Snowmobile | Body of Water | Ice Thickness < T1 |
| Snowmobile | Dense Forest | Forest Density > D1 |
| Snowmobile | Fence or Private Property | |
| ATV | Steep Incline | ECO: Slope > S7<br>NORMAL: Slope > S8 (S8 > S7)<br>SPORT: Slope > S9 (S9 > S8) |
| ... | ... | ... |

FIG. 6

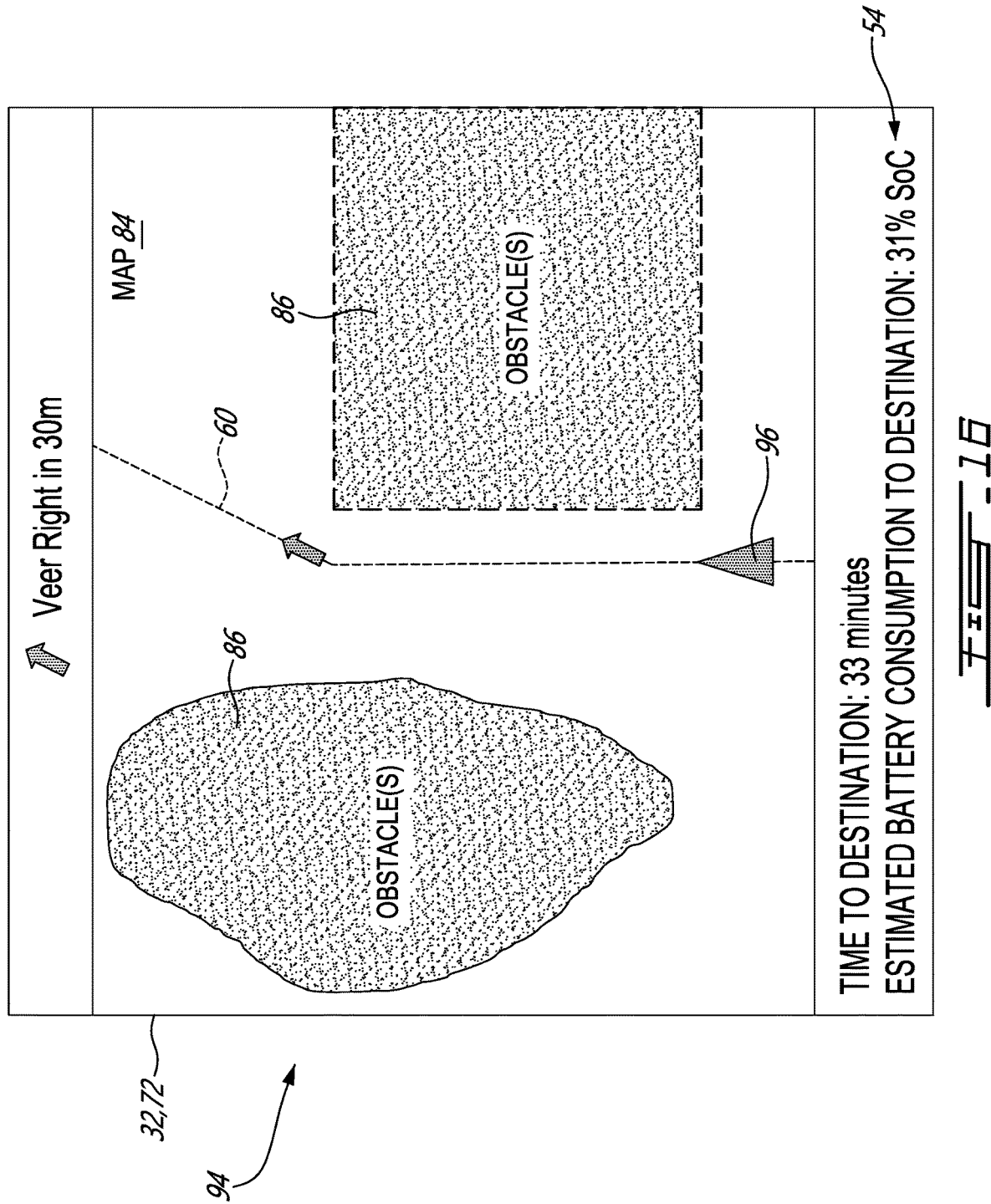

SYSTEM AND METHOD FACILITATING TRAVEL OF AN ELECTRIC OFF-ROAD VEHICLE ON AN UNCHARTED ROUTE

CROSS-REFERENCE TO RELATED APPLICATIONS

This application claims priority from U.S. Provisional Patent Application No. 63/255,518, filed Oct. 14, 2021, and from U.S. Provisional Patent Application No. 63/336,366, filed Apr. 29, 2022, both of which are incorporated by reference in their entirety herein.

TECHNICAL FIELD

The disclosure relates generally to electric off-road vehicles, and more particularly to operating electric off-road vehicles on uncharted off-road routes.

BACKGROUND

Off-road vehicles such as snowmobiles and all-terrain vehicles are often driven on charted off-road trails. Trip planning for off-road vehicles can be done using trail maps. However, some operators of off-road vehicles may want to operate their off-road vehicles in uncharted territory and not limit their riding experiences to charted trails defined in trail maps. The operation of an off-road vehicle on an uncharted off-road route can create uncertainty with the operator as to whether the uncharted route can safely be traveled with the off-road vehicle. Improvement is desirable.

SUMMARY

In one aspect, the disclosure describes a computer-implemented method facilitating travel of an electric off-road vehicle on an uncharted off-road route. The method comprises:
  relating the uncharted off-road route to be travelled by the electric off-road vehicle to map data of a geographic area including the uncharted off-road route;
  determining, using the map data, one or more geographic characteristics of the uncharted off-road route;
  determining, using the one or more geographic characteristics of the uncharted off-road route and predetermined battery consumption data associated with the one or more geographic characteristics, an estimated battery consumption for the electric off-road vehicle to travel the uncharted off-road route; and
  communicating the estimated battery consumption to an operator of the electric off-road vehicle.

The method may comprise: receiving an identification of a starting location for the electric off-road vehicle and an identification of a destination for the electric off-road vehicle; determining, using the map data, a path of the uncharted off-road route between the starting location and the destination, the map data defining one or more obstacles for the electric off-road vehicle, the uncharted off-road route avoiding the one or more obstacles; and communicating the uncharted off-road route to the operator of the electric off-road vehicle.

Determining the path of the uncharted off-road route may include: determining a first potential path between the starting location and the destination; and determining a second potential path between the starting location and the destination. The method may include: receiving a preference for the first potential path over the second potential path; and selecting the first potential path for the uncharted off-road route to be travelled by the electric off-road vehicle.

The estimated battery consumption may be a first estimated battery consumption required for the electric off-road vehicle to complete the first potential path. A second estimated battery consumption greater than the first estimated battery consumption may be required for the electric off-road vehicle to complete the second potential path. The preference may be indicative of a least battery consumption to complete the uncharted off-road route.

The estimated battery consumption may be a first estimated battery consumption required for the electric off-road vehicle to complete the first potential path. A second estimated battery consumption greater than the first estimated battery consumption may be required for the electric off-road vehicle to complete the second potential path. The preference may be indicative of a desire to complete the uncharted off-road route with a current state of charge (SoC) of a motoring battery of the electric off-road vehicle. The method may include: receiving the current SoC of the motoring battery of the electric off-road vehicle; determining that the first estimated battery consumption is lower than the current SoC; and determining that the second estimated battery consumption is greater than the current SoC.

The first potential path may include a first change in elevation. The second potential path may include a second change in elevation different from the first change in elevation. The preference may be for the first change in elevation of the first potential path.

The uncharted off-road route may include an operator-defined path between a starting location and a destination for the electric off-road vehicle.

The uncharted off-road route may include a computer-defined path between a starting location and a destination for the electric off-road vehicle.

The method may include: receiving an identification of a current location of the electric off-road vehicle; and using the current location of the electric off-road vehicle, guiding the operator of the electric off-road vehicle along the uncharted off-road route.

When the electric off-road vehicle is travelling on the uncharted off-road route, the method may include: determining a revised estimated battery consumption based on an actual battery consumption of the electric off-road vehicle; and communicating the revised estimated battery consumption to the operator of the electric off-road vehicle.

The one or more geographic characteristics of the uncharted off-road route may include a change in elevation over a segment of the uncharted off-road route.

The one or more geographic characteristics of the uncharted off-road route may include a terrain condition over a segment of the uncharted off-road route.

The one or more obstacles may include one or more of the following: a steep incline, a steep decline, a body of water, and a forest.

The predetermined battery consumption data may be based on historical battery consumption data recorded from previous travel on one or more routes other than the uncharted off-road route.

The electric off-road vehicle may be a snowmobile.

Embodiments may include combinations of the above features.

In another aspect, the disclosure describes a computer program product for facilitating travel of an off-road vehicle to a destination via an uncharted off-road route, the computer program product comprising a non-transitory computer readable storage medium having program code embodied therewith, the program code readable/executable by a computer, processor or logic circuit to perform a method as described herein.

In another aspect, the disclosure describes a system facilitating travel of an electric off-road vehicle on an uncharted off-road route. The system comprises:
an operator interface;
one or more data processors operatively connected to the operator interface; and
non-transitory machine-readable memory storing:
the uncharted off-road route to be travelled by the electric off-road vehicle;
map data of a geographic area including the uncharted off-road route;
predetermined battery consumption data; and
instructions executable by the one or more data processors and configured to cause the one or more data processors to:
relate the uncharted off-road route to the map data;
determine, using the map data, one or more geographic characteristics of the uncharted off-road route;
relate the one or more geographic characteristics to the predetermined battery consumption data;
determine, using the predetermined battery consumption data, an estimated battery consumption for the electric off-road vehicle to travel the uncharted off-road route; and
cause the estimated battery consumption to be communicated to an operator of the electric off-road vehicle via the operator interface.

The map data may define one or more obstacles for the electric off-road vehicle; and the instructions may be configured to cause the one or more data processors to: use an identification of a starting location for the electric off-road vehicle, an identification of a destination for the electric off-road vehicle, and the map data to determine a path of the uncharted off-road route between the starting location and the destination, the uncharted off-road route avoiding the one or more obstacles; and cause the uncharted off-road route to be communicated to the operator of the electric off-road vehicle via the operator interface.

Determining the path of the uncharted off-road route may include: determining a first potential path between the starting location and the destination; and determining a second potential path between the starting location and the destination; and the instructions may be configured to cause the one or more data processors to, using a preference for the first potential path over the second potential path, select the first potential path as the uncharted off-road route to be travelled by the electric off-road vehicle.

The instructions may be configured to cause the one or more data processors to, using a current location of the electric off-road vehicle, cause the operator interface to guide the operator of the electric off-road vehicle along the uncharted off-road route.

The predetermined battery consumption data may be based on historical battery consumption data recorded from previous travel on one or more routes other than the uncharted off-road route.

Embodiments may include combinations of the above features.

In another aspect, the disclosure describes an electric off-road vehicle comprising a system as described herein.

In another aspect, the disclosure describes an electric snowmobile comprising:
a motoring battery;
an electric motor for propelling the electric snowmobile, the electric motor being operatively connected to be driven by electric power from the motoring battery;
an operator interface; and
one or more controllers operatively connected to the operator interface, the one or more controllers being configured to:
relate an uncharted off-road route to be travelled by the electric snowmobile to map data of a geographic area including the uncharted off-road route;
determine, using the map data, one or more geographic characteristics of the uncharted off-road route;
relate the one or more geographic characteristics to predetermined battery consumption data;
determine, using the predetermined battery consumption data, an estimated battery consumption for the electric snowmobile to travel the uncharted off-road route; and
cause the estimated battery consumption to be communicated to an operator of the electric snowmobile via the operator interface.

The one or more controllers may be configured to:
receive an identification of a starting location for the electric snowmobile and an identification of a destination for the electric snowmobile;
determine, using the map data, a path of the uncharted off-road route between the starting location and the destination, the map data defining one or more obstacles for the electric snowmobile, the uncharted off-road route avoiding the one or more obstacles; and
cause the uncharted off-road route to be communicated to the operator of the electric snowmobile via the operator interface.

Determining the path of the uncharted off-road route may include: determining a first potential path between the starting location and the destination; and determining a second potential path between the starting location and the destination. The one or more controllers may be configured to: receive a preference for the first potential path over the second potential path; and select the first potential path for the uncharted off-road route to be travelled by the electric snowmobile.

The estimated battery consumption may be a first estimated battery consumption required for the electric snowmobile to complete the first potential path. A second estimated battery consumption greater than the first estimated battery consumption may be required for the electric snowmobile to complete the second potential path. The preference may be indicative of a desire to complete the uncharted off-road route with a current state of charge (SoC) of the motoring battery of the electric snowmobile.

The one or more controllers may be configured to: receive the current SoC of the motoring battery of the electric snowmobile; determine that the first estimated battery consumption is lower than the current SoC; and determine that the second estimated battery consumption is greater than the current SoC.

The one or more obstacles may include one or more of the following: a steep incline, a steep decline, a body of water, and a forest.

The electric snowmobile may comprise a global positioning system (GPS) receiver operatively connected to the one or more controllers, wherein the one or more controllers are configured to, using a current location of the electric snowmobile determined using the GPS receiver, cause the operator interface to guide the operator of the electric snowmobile along the uncharted off-road route.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic representation of an exemplary electric off-road vehicle including an onboard system for facilitating travel of the electric off-road vehicle on an uncharted off-road route;

FIG. 2 is another schematic representation of the electric off-road vehicle of FIG. 1;

FIG. 3 is a schematic representation of an exemplary network system for facilitating travel of the electric off-road vehicle on the uncharted off-road route;

FIG. 4 is a schematic representation of an exemplary server of the network system of FIG. 3;

FIG. 5 is an exemplary data structure storing predetermined battery consumptions associated with various vehicle types and operating conditions;

FIG. 6 is an exemplary data structure defining obstacles for various vehicle types;

FIG. 16 is an illustration of an exemplary operator interface for guiding the operator along the uncharted off-road route.

DETAILED DESCRIPTION

Figure 7:
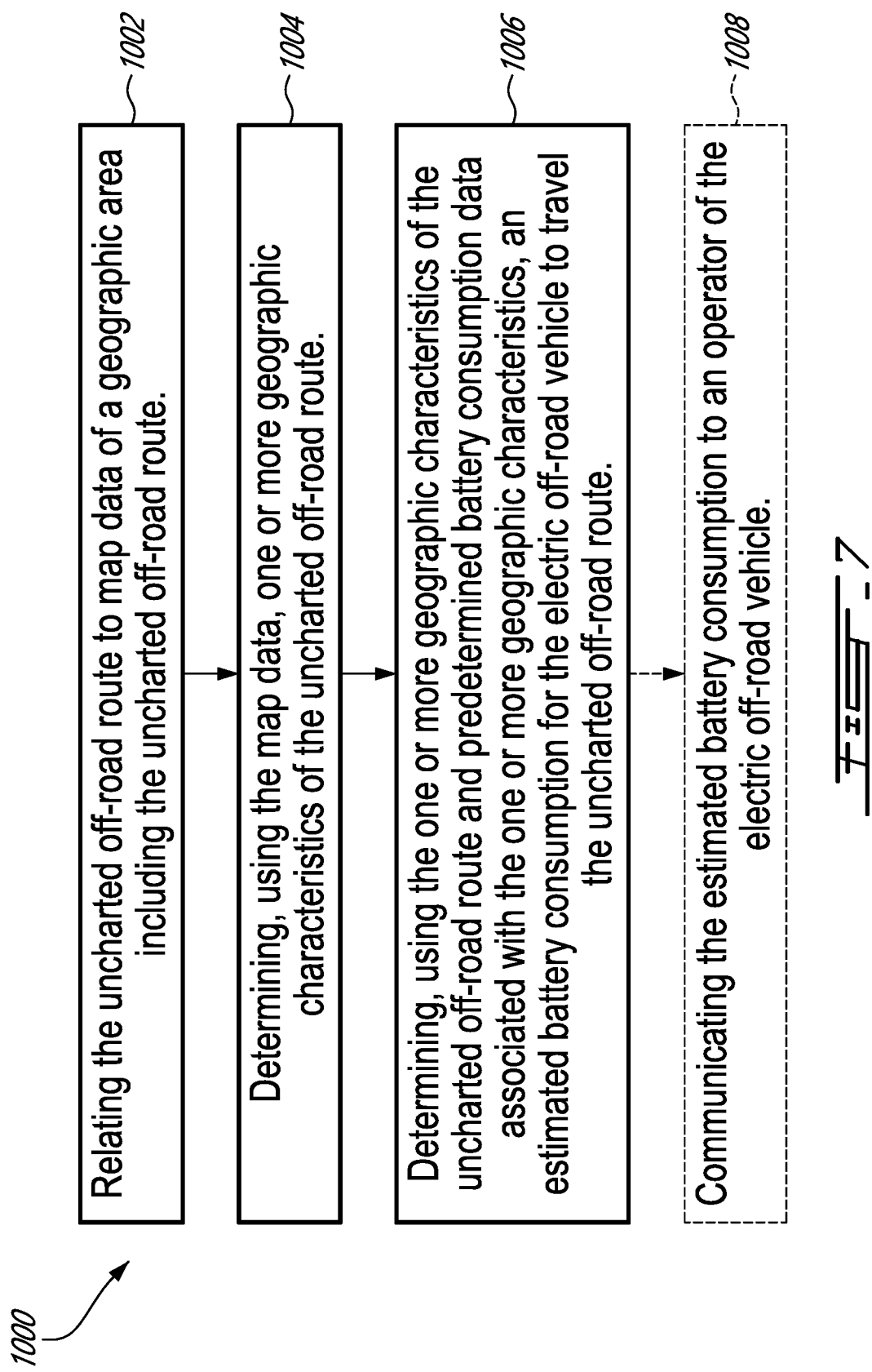
FIG. 7 is a flow diagram of an exemplary method of facilitating travel of the electric off-road vehicle on an uncharted off-road route.

The present disclosure relates to systems and methods for facilitating the operation of electric off-road vehicles along uncharted off-road routes that are not shown or defined on a trail map, and that may also be unknown to operators of the off-road vehicles. In some embodiments, the systems and methods described herein may improve the operation of an electric off-road vehicle by promoting safe and pleasant travel of the off-road vehicle on an uncharted off-road route.

For example, the systems and methods described herein may determine an estimated battery consumption required by the electric off-road vehicle to travel some or all of an uncharted off-road route, and communicate the estimated battery consumption to an operator of the electric off-road vehicle. In some embodiments, the systems and methods described herein may relate the uncharted off-road route to map data to determine one or more geographic characteristics of the uncharted off-road route. The geographic characteristic(s) of the uncharted off-road route may then be related to predetermined (e.g., historical) battery consumption data to determine the estimated battery consumption required to travel the uncharted off-road route.

In some embodiments, the systems and methods described herein may automatically or semi-automatically define a path for the uncharted off-road route that avoids obstacles (e.g., cliffs, unfrozen bodies of water and dense forests) defined in map data. Such obstacles may include geographic characteristics that could potentially be dangerous or unpleasant for the operator, and/or geographic characteristics that are beyond the capabilities of the electric off-road vehicle.

The term "connected" may include both direct connection (in which two elements that are connected to each other contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 is a schematic representation of an exemplary electric off-road vehicle 10 (referred hereinafter as "vehicle 10"), which may include onboard system 12 for facilitating the operation of vehicle 10 on an uncharted off-road route. As illustrated in FIG. 1, vehicle 10 may be an electric snowmobile but it is understood that the systems and methods described herein may also be used with other types of electric off-road vehicles including utility task vehicles (UTVs), such as side-by-side vehicles, and all-terrain vehicles (ATVs) for example. In some embodiments, vehicle 10 may be an electric snowmobile including elements of the snow vehicle described in International Patent Publication no. WO 2019/049109 A1 (Title: Battery arrangement for electric snow vehicles), and U.S. Patent Application No. 63/135,497 (Title: Electric vehicle with battery pack as structural element), which are incorporated herein by reference.

Vehicle 10 may include a frame (also known as a chassis) which may include tunnel 14, track 16 having the form of an endless belt for engaging the ground and disposed under tunnel 14, one or more electric motors 18 (referred hereinafter in the singular as "motor 18") mounted to the frame and configured to drive track 16, left and right skis 20 disposed in a front portion of vehicle 10, straddle seat 22 disposed above tunnel 14 for accommodating an operator of vehicle 10 and optionally one or more passengers. Skis 20 may be movably connected to the frame to permit steering of vehicle 10 via a steering assembly including a steering column interconnecting handlebar 24 with skis 20.

Motor 18 may be drivingly connected to track 16 via a drive shaft to cause propulsion of vehicle 10. Motor 18 may be in torque-transmitting engagement with the drive shaft via a belt/pulley drive. However, motor 18 may be in torque-transmitting engagement with the drive shaft via other arrangements such as a chain/sprocket drive, or shaft/ gear drive for example. The drive shaft may be drivingly connected to track 16 via one or more toothed wheels or other means so as to transfer motive power from motor 18 to track 16.

Vehicle 10 may also include one or more (e.g., high-voltage) batteries 26 (referred hereinafter in the singular as "battery 26") for providing electric power to motor 18 and driving motor 18. Battery 26 may be a main battery pack used for propelling vehicle 10, and may be referred to as a motoring battery. Battery 26 may be disposed under seat 22. The operation of motor 18 may be controlled by one or more controllers 28 (referred hereinafter in the singular) based on an actuation of accelerator 30, also referred to as "throttle", by the operator. In some embodiments, battery 26 may be a rechargeable lithium ion or other type of battery. In some embodiments, battery 26 may be configured to output electric power at a voltage of between 300-400 volts, or up to 800 volts, for example.

Vehicle 10 may include onboard operator interface 32, which may include an instrument panel and/or one or more other display devices for displaying (e.g., status) information about one or more systems of vehicle 10. Onboard operator interface 32 may include one or more indicators such as needle indicators, gages, dials and digital readouts for displaying information about vehicle 10. Onboard operator interface 32 may include a liquid crystal display (LCD) screen, thin-film-transistor (TFT) LCD screen, light-emitting diode (LED) or other suitable display device operatively connected to controller 28 and/or to one or more other systems of vehicle 10. Onboard operator interface 32 may include one or more input devices for manipulation by the operator to facilitate operator inputs. Such input devices may, for example, include rotary switches, toggle switches, push buttons, knobs, dials, touch-sensitive display devices, etc. The input devices may include one or more physical (hard) devices and/or one or more graphical objects on a graphical operator interface provided on a touch-sensitive display screen of operator interface 32 for example.

As explained further below, onboard operator interface 32 may be capable of being controlled by controller 28 to selectively display information to facilitate trip planning by communicating an uncharted off-road route to the operator, communicating an estimated battery consumption associated with the uncharted off-road route, and/or guiding the operator along the uncharted off-road route when vehicle 10 is travelling the uncharted off-road route.

In some embodiments, vehicle 10 may include onboard antenna 34 operatively connected to wireless transceiver 56 (shown in FIG. 2) and controller 28 to permit receipt and transmission of data to and from vehicle 10. Alternatively, or in addition, vehicle 10 may include one or more physical (e.g., Universal Serial Bus (USB)) port to permit wired data communication (e.g., receipt and transmission) with a personal electronic device such as a smartphone, laptop computer or tablet computer for example.

FIG. 2 is another schematic representation of vehicle 10. As illustrated, onboard system 12 may include several components of vehicle 10, such as controller 28, wireless transceiver 56, onboard operator interface 32 and GPS receiver 58, for example. Motor 18 may provide propulsive power to vehicle 10 and may be part of powertrain 36 of vehicle 10. In various embodiments, motor 18 may be a permanent magnet synchronous motor or a brushless direct current motor for example. Motor 18 may have a power output of between 90 KW and 135 KW, or motor 18 may have a maximum output power of greater than 135 KW, for example. Motor 18 may be of a same type as, or may include elements of, the motors described in U.S. Provisional Patent Applications no. U.S. 63/135,466 (Title: Drive unit for electric vehicle) and no. U.S. 63/135,474 (Title: Drive unit with fluid pathways for electric vehicle), which are incorporated herein by reference.

Motor 18 may be drivingly connected to track 16 in embodiments where vehicle 10 is a snowmobile for example. For UTVs and ATVs, motor 18 may be drivingly connected to ground-engaging wheels. Powertrain 36 may also include battery 26 for providing electric power to motor 18. The operation of motor 18 and the delivery of electric power to motor 18 may be controlled by controller 28 via output(s) 38 and power electronics module 40 (referred hereinafter as "PEM 40"). PEM 40 may include suitable electronic switches (e.g., insulated gate bipolar transistor(s)) to provide motor 18 with electric power having the desired voltage, current, waveform, etc. to implement the desired performance of vehicle 10 based on an actuation of accelerator 30 by the operator to indicate a command to propel vehicle 10. In some embodiments, PEM 40 may include a motor controller and/or power inverter for example.

Vehicle 10 may include one or more sensors 42 operatively connected to component(s) of powertrain 36. Sensor(s) 42 may be configured to sense one or more parameters of powertrain 36. Controller 28, via the control of PEM 40 and using feedback from sensor(s) 42, may control the amount of motive power that may be output from powertrain 36 during propulsion of vehicle 10, and also control the amount of electric power that may be delivered to battery 26 during regenerative braking. Controller 28 may include a computer including one or more data processors 44 (referred hereinafter as "processor 44") and non-transitory machine-readable memory 46. Controller 28 may be operatively connected to sensor(s) 42 via wired or wireless connections for example so that one or more parameters acquired via sensor(s) 42 may be received at controller 28 and used by processor 44 in one or more procedures or steps defined by machine-readable instructions 48 stored in memory 46 and executable by processor 44. Controller 28 may carry out additional functions than those described herein.

Processor 44 may include any suitable device(s) configured to cause a series of steps to be performed by controller 28 so as to implement a computer-implemented process such that instructions 48, when executed by controller 28 or other programmable apparatus, may cause the functions/acts to be executed. Processor 44 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 46 may include any suitable machine-readable storage medium. Memory 46 may include non-transitory computer readable storage medium such as, for example, but not limited to, an electronic, magnetic, optical, electromagnetic, infrared, or semiconductor system, apparatus, or device, or any suitable combination of the foregoing. Memory 46 may include a suitable combination of any type of machine-readable memory that is located either internally or externally to controller 28. Memory 46 may include any storage means (e.g. devices) suitable for retrievably storing machine-readable instructions executable by processor 44.

Sensor(s) 42 may include one or more current sensors and/or one or more voltage sensors operatively connected to battery 26 and/or operatively connected to PEM 40. Sensor(s) 42 may include a position sensor (e.g., encoder) operatively coupled to motor 18 to measure a position and/or rotational speed of a rotor of motor 18. Sensor(s) 42 may include a speed sensor (e.g., revolution counter) operatively coupled to motor 18 to measure the rotational speed of motor 18. Sensor(s) 42 may include a torque sensor operatively coupled to motor 18 to measure an output torque of motor 18. Sensor(s) 42 may acquire one or more signals indicative of, or useful in inferring, one or more operating parameters of powertrain 36. For example, sensor(s) 42 may acquire one or more signals indicative of, or useful in inferring, an actual (e.g., current, live, real-time) state of charge 50 (referred hereinafter as "SoC 50") of battery 26 and/or other parameters of powertrain 36. For example, sensor(s) 42 may implement coulomb counting using a current sensor to infer SoC 50 of battery 26. SoC 50 may be expressed as a percentage of the capacity of battery 26 (e.g., 0%=empty; 100%=full), or as any other suitable indication.

Sensor(s) 42 may acquire one or more signals indicative of, or useful in deriving, actual (e.g., current, live, real-time) battery consumption 52 of battery 26 as vehicle 10 is driven. Actual battery consumption 52 may be indicative of a discharge rate (i.e., power utilization rate or cost) of battery 26 over time and/or over a distance travelled by vehicle 10. For example, actual battery consumption 52 may be expressed as a percentage of the capacity of battery 26 over time or distance (e.g., SoC (%)/hour; SoC (%)/km). Alternatively, actual battery consumption 52 may be expressed as kilowatt-hours-per-kilometer for example.

SoC 50 and/or actual battery consumption 52 may be computed by controller 28 using data acquired via sensor(s) 42. As explained below, SoC 50 and/or actual battery consumption 52 may be used to verify estimated battery consumption 54 and revise (if needed) estimated battery consumption 54 as vehicle 10 is driven along the uncharted off-road route.

Vehicle 10 may be capable of data communication with one or more devices external to vehicle 10. Vehicle 10 may include wireless transceiver 56 operatively connected to controller 28 to enable receipt and transmission of data to and from vehicle 10 via onboard antenna 34. Wireless transceiver 56 may be configured for wireless data communication at one or more frequencies (e.g., 915 MHZ and/or at 2.4 GHz). Wireless transceiver 56 may be configured for wireless data communication via local area network (LAN), wide area network (WAN), cellular (e.g., 4G or Long-Term Evolution (LTE)) network, internet-based network, satellite-based network, Wi-Fi, Bluetooth® or other suitable type of network.

Vehicle 10 may include a satellite navigation device, referred herein as a global positioning system (GPS) receiver 58, operatively connected to controller 28. GPS receiver 58 may be capable of receiving (sensing) information from global navigation satellite systems (GNSS) satellites that may be used to calculate a geographical position of vehicle 10 relative to map data 62 for example. The information received at GPS receiver 58 may also be used to calculate an estimated actual velocity of vehicle 10 and/or determine an actual position of vehicle 10 along a route or relative to a route. The information received at GPS receiver 58 may also be used to determine actual battery consumption 52 as a function of distance travelled substantially in real-time as vehicle 10 is travelling.

Memory 46 may also store a digital definition of uncharted off-road route 60 (referred hereinafter as "uncharted route 60"). As explained below, uncharted route 60 may be determined by onboard system 12, or may be determined by a device external to vehicle 10 and communicated to vehicle 10 via wireless transceiver 56 for example. Uncharted route 60 may be operator-defined or computer-defined using map data 62, and optionally also using predetermined battery consumption data 64. As explained below, estimated battery consumption 54 may be determined by onboard system 12 or may be determined by a device eternal to vehicle 10 and communicated to vehicle 10 via wireless transceiver 56 for example. Estimated battery consumption 54 may be determined using map data 62 and optionally also predetermined battery consumption data 64.

FIG. 3 is a schematic representation of an exemplary network 66 for facilitating the travel of vehicle 10 on uncharted route 60. Network system 66 may include one or more optional servers 68 (referred hereinafter in the singular) in data communication with vehicle 10 and/or with one or a plurality of other off-road vehicles 10 via communication network system 66. Accordingly, server 68 may be in data communication with multiple electric off-road vehicles including fleets of electric off-road vehicles. Network system 66 may include one or more network antennas 70. Network system 66 may include a local area network (LAN), wide area network (WAN), cellular (e.g., 4G or Long-Term Evolution (LTE)) network, internet-based network, satellite-based network, Wi-Fi or other suitable type of network.

Network system 66 may include one or more external operator interfaces 72 (referred hereinafter in the singular) that may be provided via personal electronic devices such as a smartphone, a tablet computer and/or a laptop computer for example. External operator interface 72 may be in direct wireless or wired data communication (e.g., paired via Bluetooth® or connected via a physical data port) with vehicle 10, or indirect wireless data communication with vehicle 10 via other elements of network system 66. In some embodiments, data communication between vehicle 10 and server 68 may be established via the personal electronic device(s), which may be in wired or wireless data communication with vehicle 10.

External operator interface 72 may also be in data communication with server 68. In some embodiments, external operator interface 72 may include a webpage provided by a website and displayed to the operator using a web browser. External operator interface 72 may be provided via an application (app) running on a smartphone, tablet computer and/or on a laptop computer for example.

In various embodiments, functionalities such as the definition of uncharted route 60 and the determination of estimated battery consumption 54 may be facilitated via onboard operator interface 32 and/or via external operator interface 72. In various embodiments, methods described herein may be performed by onboard system 12 of vehicle 10 or by server 68. In some embodiments, some aspects of methods described herein may be performed by onboard system 12 of vehicle 10, and some (e.g., other) aspects of the methods may be performed by server 68 and/or other components of network system 66.

FIG. 4 is an exemplary schematic representation of optional server 68 of communication network system 66. Server 68 may include a computer configured for data communication with other elements of network system 66 via antenna 74. Server 68 may include one or more computing devices and one or more data storage and retrieval devices remote of vehicle 10. For example, server 68 may include one or more data processors 76 (referred hereinafter in the singular as "processor 76") operatively connected to memory 78. Processor 76 may include any suitable device(s) configured to cause a series of steps to be performed by server 68 so as to implement a computer-implemented process such that instructions 80, when executed by server 68 or other programmable apparatus, may cause the functions/acts specified in the methods described herein to be executed. Memory 78 may include any suitable machine-readable storage medium. Memory 78 may include non-transitory computer readable storage medium (e.g. devices) suitable for retrievably storing machine-readable instructions 80 executable by processor 76.

Server 68 may be in continuous or periodic data communication with external operator interface 72 and/or onboard operator interface 32 to facilitate the definition of uncharted route 60 and/or the determination of estimated battery consumption 54 for uncharted route 60. Server 68 may be in continuous or periodic data communication with vehicle 10 and/or with one or more other vehicles in order to collect (e.g., sensed and/or operator-input) data from vehicle 10 and/or from other vehicles, including one or more fleets of electric off-road vehicles and/or multiple vehicles from one or manufacturers of electric off-road vehicles. The data collected may include GPS data to facilitate the definition of uncharted route 60 and the guidance of the operator along uncharted route 60, actual battery consumption 52 of vehicle 10 as vehicle 10 is travelling, and/or other operating conditions associated with the operation of vehicle 10 or of other electric off-road vehicles.

Operating conditions may be sensed, input by an operator of vehicle 10, and/or retrieved from another data source (e.g., weather data, map data 62, satellite imagery), and may include: an ambient temperature at vehicle 10; a weight carried by vehicle 10; data relating to driving habits such as average (and/or maximum) speed of vehicle 10, acceleration, average (and/or maximum) torque output from motor 18, vehicle operating mode (e.g. eco, sport, normal), terrain conditions (e.g. snow, ice, grass), and topography (e.g., elevation change). Other data related to performance and/or maintenance of vehicle 10 may also be collected by server 68, such as the age of battery 26, actual/current SoC 50, actual battery consumption 52 of battery 26 and/or length of track 16. The data collected by server 68 may be used to build a database of predetermined battery consumption data 64 in the form shown in FIG. 5 based on past (i.e., historical) battery consumption associated with various operating conditions, and which may later be used (e.g., accessed) to determine estimated battery consumption 54 for future trips having similar operating conditions.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memories 46 and/or 78) having computer readable program code (e.g., instructions 48 and/or 80) embodied thereon. Computer program code for carrying out operations for aspects of the present disclosure in accordance with instructions 48 and/or 80 may be written in any combination of one or more programming languages. Such program code may be executed entirely or in part by controller 28 and/or server 68 or other data processing device(s). It is understood that, based on the present disclosure, one skilled in the relevant arts could readily write computer program code for implementing the methods described and illustrated herein.

FIG. 5 is an exemplary data structure storing predetermined battery consumption data 64 including predetermined battery consumption values associated with different vehicle types, geographic characteristics and optionally also other vehicle conditions. Geographic characteristics may include physical and/or biological characteristics of the earth's surface. For example, geographic characteristics may include topographic characteristics defining the configuration of the earth's surface such as its relief and the location of natural and man-made features. Topographic characteristics may include a change in elevation over a distance to determine whether a segment of uncharted route 60 defines an incline, decline or level ground, and also to quantify such change in elevation in terms of slope to quantify steepness for example. Another geographic characteristic may include a terrain condition indicating whether the ground (i.e., riding surface) is covered with snow, a body of water is covered with ice, or the ground is covered with grass for example. Another geographic characteristic may include forest or vegetation density that may be useful in determining whether or not a geographic region may be considered an obstacle to vehicle 10.

The relevant geographic characteristics of the geographic region including uncharted route 60 may be defined by map data 62 or otherwise be available to vehicle 10 and/or to server 68. In some embodiments, server 68 and/or vehicle 10 may have access to one or more other data sources (e.g., third party databases, satellite imagery, actual measurements) containing relevant map data 62 including topography and other geographic information, and weather data for example. Such other data sources may be used in the methods disclosed herein.

The predetermined battery consumption values may also be associated with different operating conditions of the vehicles such as the load carried by the vehicles and the (average) speed at which the vehicles are operated. The other operating conditions may include other parameters indicative of driving habits of the operators, which may affect the battery consumption. In some embodiments, a suitable load sensor (e.g., load cell) onboard vehicle 10 may provide an indication of the weight carried by vehicle 10. In some embodiments, a torque output by motor 18 relative to a (e.g., GPS or motor) speed of vehicle 10 may also be indicative of the weight carried by vehicle 10.

The predetermined battery consumption values may be determined or derived from battery consumption information available for vehicles operating at known operating conditions on charted routes having known geographic characteristics. Accordingly, historical battery consumption values for vehicles traveling on charted routes may be used for determining estimated battery consumption 54 for an uncharted route 60.

The geographic characteristics and other operating conditions shown in FIG. 5 are non-limiting examples and it is understood that predetermined battery consumption values may be associated with additional or fewer characteristics and/or conditions. In other words, the level of granularity in predetermined battery consumption data 64 may be selected based on a level of accuracy desired in the estimated battery consumption 54 provided. The battery consumption values may be represented as (e.g., average) energy consumption measures as a function of distance along the route such as Wh/km or SoC/km as shown in FIG. 5 for example.

Determining estimated battery consumption 54 may be performed by performing filtering or other functions using predetermined battery consumption data 64. In the case where uncharted route 60 is made up of a plurality of segments having different geographic characteristics and/or operating conditions, determining estimated battery consumption 54 for uncharted route 60 may be performed by filtering the predetermined battery consumption data 64 to determine the battery consumption values corresponding to the same or similar operating condition(s) and that must be combined together to determine an overall estimated battery consumption 54 to complete the uncharted route 60, or to complete a selected portion thereof.

Battery consumption data 64 may be defined in a suitable database or look-up table stored at server 68 or stored onboard vehicle 10. Estimated battery consumption 54 for uncharted route 60 may be determined at server 68 or locally onboard vehicle 10, and communicated to the operator via onboard operator interface 32 and/or via external operator interface 72. Battery consumption data 64 may include an organized collection of data that may be stored and accessible electronically. Battery consumption data 64 may include historical battery consumption data derived from previous travel by one or more vehicles similar or identical to vehicle 10 (i.e., a common vehicle type or a common vehicle make/model) along one or more routes other than uncharted route 60. Battery consumption data 64 may be periodically or continuously updated to refine the battery consumption values as more data becomes available from past trips made by vehicle 10 or by other electric off-road vehicles on charted off-road trails and/or on uncharted routes. Such off-road trails may be intended to be travelled by off-road vehicles and may exclude public roads and streets. In some embodiments, the battery consumption values include average, median, maximum and/or minimum values associated with respective operating conditions or with a combination of operating conditions.

The database containing predetermined battery consumption data 64 may be constructed and used by a suitable database management system (DBMS). The DBMS may include software that facilitates interactions with end users (e.g., vehicle operators), with applications, and with the database itself to capture and analyze the data. The DBMS may also include software to facilitate the administration of the database. The administration of the database may be handled by a manufacturer of vehicle 10, a retailer of vehicle 10, a (e.g., snowmobile or ATV) riding club to which the operator of vehicle 10 belongs, and/or other service provider(s) that may provide a trip planning service to the operator of vehicle 10.

In some embodiments, the acquisition of historical battery consumption values for deriving predetermined battery consumption data 64 can be done as described in U.S. Provisional Patent Application No. 63/255,518 (Title: SYSTEMS AND METHODS OF FACILITATING AN OPERATION OF AN ELECTRIC OFF-ROAD VEHICLE), which is incorporated herein by reference.

Instead or in addition to using a database, the predetermined battery consumption data 64 may be used as a dataset to train an artificial intelligence model that may then be used to determine suitable estimated battery consumption 54. For example, a machine learning model such as an artificial neural network may be trained using the historical battery consumption data and then used to provide estimated battery consumption 54 based on operator requests, or to revise estimated battery consumption 54 based on actual battery consumption during an actual trip.

Instead or in addition to using historical battery consumption values, predetermined battery consumption data 64 may include theoretical battery consumption values that are calculated by modeling and/or simulation for example.

In some embodiments, some (e.g., a subset of) battery consumption data 64 may be stored onboard vehicle 10 and used by controller 28 of vehicle 10 to determine estimated battery consumption 54 onboard of vehicle 10 (e.g., without the use of server 68), and communicate estimated battery consumption 54 to the operator via onboard operator interface 32 and/or external operator interface 72.

FIG. 6 is an exemplary data structure of obstacle data 82 defining obstacles 86 (shown in FIGS. 8 and 11-14 and 16), for various vehicle types. Obstacles 86 may correspond to geographic characteristics that could potentially be dangerous or unpleasant for the operator and/or that may be beyond the capabilities of vehicle 10. Obstacles 86 may be defined using one or more criteria that are then applied to (e.g., geographic) map data 62 in order to identify one or more obstacles 86 within map data 62 to facilitate the definition of uncharted route 60. In other words, criteria may be used to characterize the applicability of an obstacle 86 to the definition of an uncharted route. In some embodiments, the criteria for obstacles 86 may be specific to vehicle types.

In some embodiments, the criteria for obstacles 86 may be specific to an operating mode of vehicle 10. For example, vehicle 10 may be equipped with factory-defined operating modes such as economy (e.g., "range"), normal and sport modes, which may define different performance characteristics of vehicle 10. Such operating modes may correspond to performance and/or operator skill levels such as novice, intermediate and expert respectively, and may come with factory-defined sets of operating parameters for vehicle 10. For example, an "eco" or economy operating mode may be intended to assist the operator in driving in a way that promotes an extended battery range. A sport operating mode may be intended to provide increased acceleration responsiveness. A normal mode may facilitate a vehicle performance between the economy and sport modes. For example, in a situation where vehicle 10 is in an "eco" operating mode, uncharted route 60 with reduced elevation changes may be selected to limit battery consumption. Conversely, in a situation where vehicle 10 is in a "sport" operating mode, uncharted route 60 with greater elevation changes and/or that is more challenging may be selected to correspond to the operator's riding preference.

Examples of obstacles 86 may include excessively steep inclines or declines (e.g., cliffs), unfrozen bodies of water, frozen bodies of water with insufficient ice thicknesses, excessively dense forests, fences, and private properties. Excessive inclines may be defined by positive slopes S1, S2 and S3 that may be derived from changes in elevation defined by map data 62. Excessive declines may be defined by negative slopes S4, S5 and S6 that may also be derived from changes in elevation defined by map data 62. The ice thickness over a body of water and the forest density may be obtained from map data 62, from another data source such as a third party database, or from in-situ measurement(s) for example.

FIG. 7 is a flow diagram of an exemplary method 1000 of facilitating the travel of vehicle 10 or of another electric off-road vehicle on uncharted route 60. Aspects of method 1000 may be combined with other actions or steps described herein. In various embodiments, method 1000 may be carried out using onboard system 12, network system 66, or a combination of both onboard system 12 and network system 66. Functions and other aspects of vehicle 10, onboard system 12 and network system 66 may be incorporated into method 1000. In various embodiments, method 1000 may be computer-implemented and may include:

relating the uncharted route 60 to be travelled by vehicle 10 to map data 62 of a geographic area including uncharted route 60 (block 1002);

determining, using map data 62, one or more geographic characteristics of uncharted route 60 (block 1004);

determining, using the one or more geographic characteristics of uncharted route 60 and predetermined battery consumption data 64 associated with the one or more geographic characteristics of the uncharted off-road route, an estimated battery consumption for vehicle 10 to travel the uncharted off-road route (block 1006); and communicating the estimated battery consumption to an operator of the electric off-road vehicle (optional block 1008).

Aspects of method 1000 are described below in reference to other figures.

Figure 8:
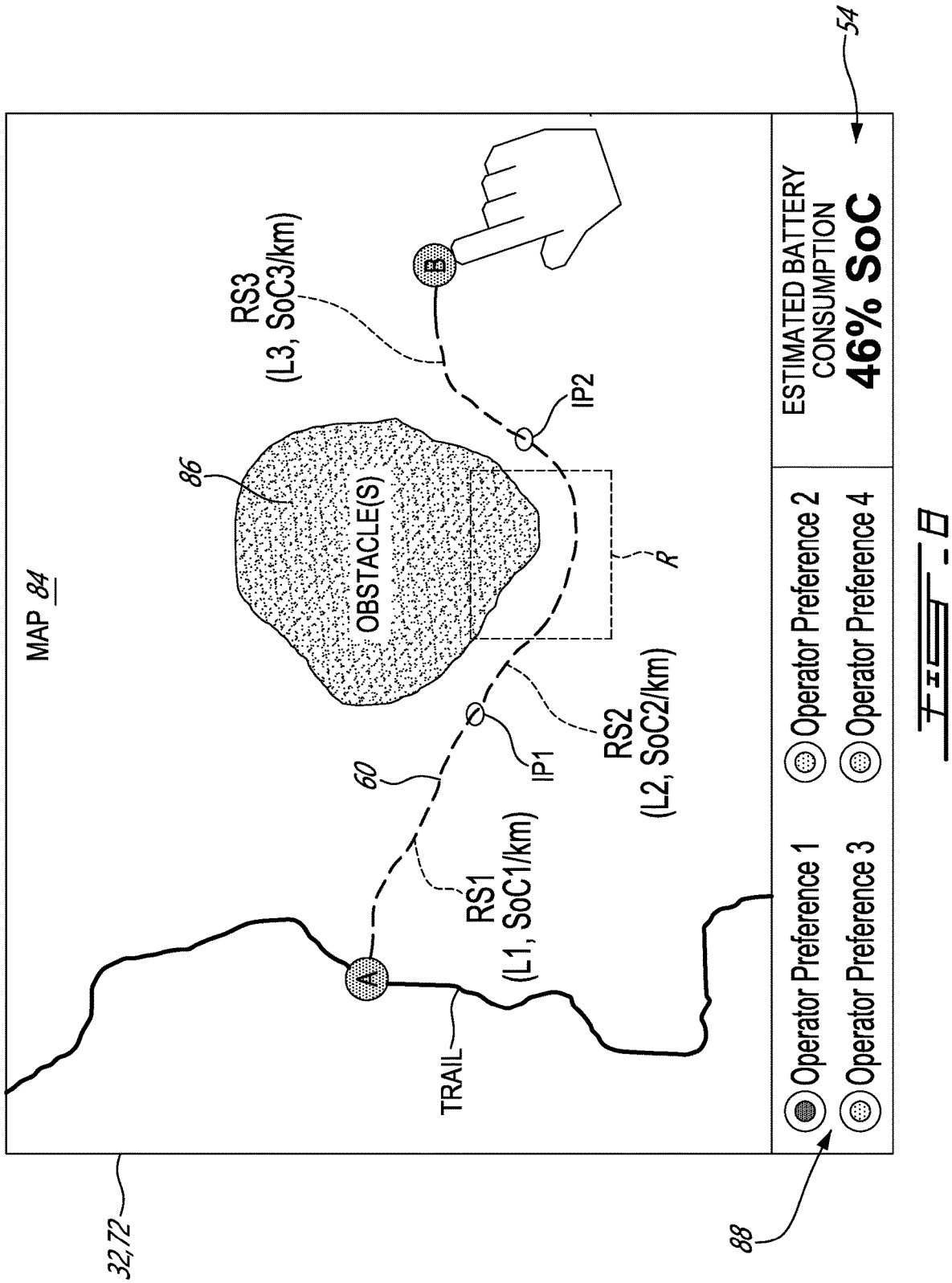
FIG. 8 is an illustration of an exemplary operator interface for facilitating the determination of a computer-defined path of the uncharted off-road route.

FIG. 8 is an illustration of an exemplary operator interface 32, 72 such as a (e.g., touch-sensitive) display screen for facilitating the determination of a computer-defined path for uncharted route 60 and also for determining estimated battery consumption 54. The same procedure as described herein may also be used to determine estimated battery consumption 54 for an operator-defined path for uncharted route 60. Uncharted route 60 may extend from starting location A to destination B. Operator interface 32, 72 may display map 84 of the geographic area including uncharted route 60. Map 84 may be displayed according to map data 62. Map data 62 may define one or more charted trails identified as "TRAIL" in map 84 of FIG. 8. Map data 62 may be combined with obstacle data 82 of FIG. 6 to define one or more obstacles 86 for vehicle 10 within the geographic region between starting location A and destination B.

A digital definition of uncharted route 60 may include a series of points (e.g., GPS coordinates) tracing uncharted route 60, and/or may include spaced apart waypoints defining uncharted route 60. The digital definition of uncharted route 60 may include linear and/or curved segments. The digital definition of uncharted route 60 may be related to (e.g., overlaid onto) map data 62 to identify geographic characteristics from map data 62 that can be assigned to route segments RS1, RS2 and RS3 of uncharted route 60. The number and respective lengths L1, L2 and L3 (i.e., travel distances) of route segments RS1, RS2 and RS3 may be determined based the geographic characteristics extracted from map data 62 and assigned to respective route segments RS1, RS2 and RS3.

Various geographic characteristics and other operating conditions such as those shown in FIG. 5, may be used individually or in combination to determine estimated battery consumption 54 associated with uncharted route 60. In the example shown in FIG. 8, the terrain condition may be determined to be snow, vehicle 10 may be heavily loaded, and it may be specified or predicted that vehicle 10 will be operated at a relatively fast speed along uncharted route 60.

First route segment RS1 may be determined to correspond to a decline based on the elevation information available in map data 62 in the region being traversed by first route segment RS1 (i.e., from starting location A to first intermediate point IP1). Based on predetermined battery consumption data 64 shown in FIG. 5, first route segment RS1 may then be associated with a specific battery consumption value of SoC1/km. Using length L1 (km) of first route segment RS1, the estimated battery consumption required to complete first route segment RS1 may be determined by multiplying L1 with SoC1/km.

Second route segment RS2 may be determined to correspond to substantially leveled ground based on the elevation information available in map data 62 in the region being traversed by second route segment RS2 (i.e., from first intermediate point IP1 to second intermediate point IP2). Based on predetermined battery consumption data 64 shown in FIG. 5, second route segment RS2 may then be associated with a specific battery consumption value of SoC2/km. Using length L2 (km) of second route segment RS2, the estimated battery consumption required to complete second route segment RS2 may be determined by multiplying L2 with SoC2/km.

Third route segment RS3 may be determined to correspond to an incline based on the elevation information available in map data 62 in the region being traversed by third route segment RS3 (i.e., from second intermediate point IP2 to destination B). Based on predetermined battery consumption data 64 shown in FIG. 5, third route segment RS3 may then be associated with a specific battery consumption value of SoC3/km. Using length L3 of third route segment RS3, the estimated battery consumption required to complete third route segment RS3 may be determined by multiplying L3 with SoC3/km. The estimated battery consumptions associated with first route segment RS1, second route segment RS2 and third route segment RS3 may then be added together to obtain the overall estimated battery consumption 54 to complete uncharted route 60. Estimated battery consumption 54 may then be communicated to the operator by being displayed in operator interface 32, 72.

In embodiments where the path of uncharted route 60 is computer-defined and automatically generated, method 1000 may include receiving an identification of starting location A for vehicle 10 and an identification of destination B for vehicle 10. Starting location A and destination B may be specified by the operator as numerical GPS coordinates via a suitable keypad, or by touching locations on map 84 displayed on operator interface 32, 72. Starting location A may be specified as a current location of vehicle 10 or as another location.

Based on map data 62, obstacle(s) 86, starting location A and destination B, method 1000 may include automatically determining a path of uncharted route 60 between starting location A and destination B. The determined path for uncharted route 60 may avoid obstacle(s) 86 defined using obstacle data 82 and map data 62. The determined path for uncharted route 60 may consider the vehicle type and vehicle operating mode (e.g. eco, sport, normal). Uncharted route 60 may then be (e.g., graphically) communicated to the operator of vehicle 10 via operator interface 32, 72 for example.

In some embodiments, one or more preferences 88 may be specified by the operator so that method 1000 may generate uncharted route 60 according to preference(s) 88 as explained further below. For example, in situations where method 1000 may identify more than one potential path between starting location A and destination B, preference(s) 88 may permit method 1000 to automatically select the path most desirable by the operator for uncharted route 60.

Figure 9:
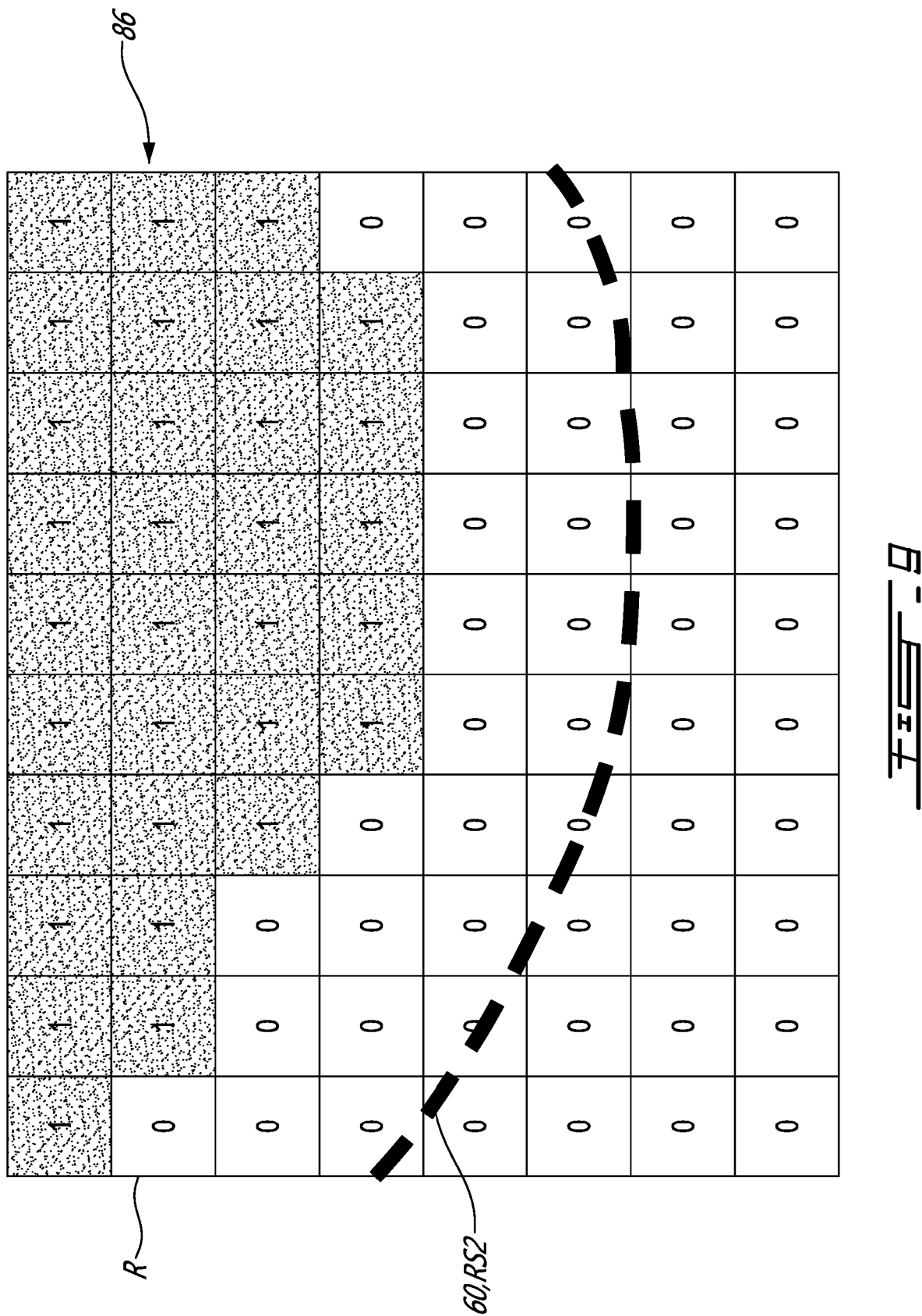
FIG. 9 is a schematic exemplary digital representation of map data defining an obstacle for the electric off-road vehicle.

FIG. 9 is a schematic exemplary digital representation of region R of map 84 shown in FIG. 8. FIG. 9 shows map data 62 combined with obstacle data 82 shown in FIG. 6. Using topographic information available from map data 62 and obstacle data 82, one or more regions of map 84 may be identified as obstacles 86 for vehicle 10 (e.g., see shaded cells in FIG. 9) and which should be avoided by uncharted route 60. Map 84 may be digitally represented as a grid of cells sized to provide a desired resolution. For the purpose of automatically tracing a path for uncharted route 60, cells corresponding to obstacle 86 to be avoided may be assigned a first value (e.g., 1), and cells not corresponding to obstacle 86 may be assigned a second value (e.g., 0) different from the first value. Method 1000 may then automatically define one or more paths between starting point A and destination B that only traverse cells assigned the second value to thereby avoid the cells assigned the first value identifying obstacle 86.

Figure 10:
FIG. 10 shows a list of preferences for facilitating the determination of the uncharted off-road route.

FIG. 10 shows a list of preferences 88 for facilitating the determination of a suitable computer-defined path for uncharted route 60 by method 1000. In situations where more than one (e.g., two) paths between starting point A and destination B can be determined (i.e., more than one solution exists), one or more preferences 88 specified by the operator may be used in method 1000 to identify the more desirable path to use for uncharted route 60. For example, in situations where a first potential path and a second potential path are determined to exist between starting point A and destination B while avoiding obstacles 86, method 1000 may include receiving one or more preferences 88 for the first potential path over the second potential path. Based on such preference(s) 88, method 1000 may select the first potential path for the uncharted route 60 to be travelled by vehicle 10.

As an example, one preference 88A may be that uncharted route 60 should have the shortest possible travel distance between starting point A and destination B. Another preference 88B may be that uncharted route 60 should be close to bodies of water as much as possible. Another preference 88C may be that uncharted route 60 should avoid frozen bodies of water even if the ice thickness is sufficient. Another preference 88D may be that uncharted route 60 should be selected to have the least battery consumption. Another preference 88E may be that uncharted route 60 should be completed with the current SoC of battery 26. Another preference 88F may be that uncharted route 60 should be selected to have a large change in elevation. Another preference 88G may be that uncharted route 60 should be selected to have a small change in elevation. Another preference 88H may be that the operator will select from the two or more paths available for uncharted route 60. Another preference 88I may be that the operator will define the path of uncharted route 60 via map 84 shown on operator interface 32, 72.

Figure 11:
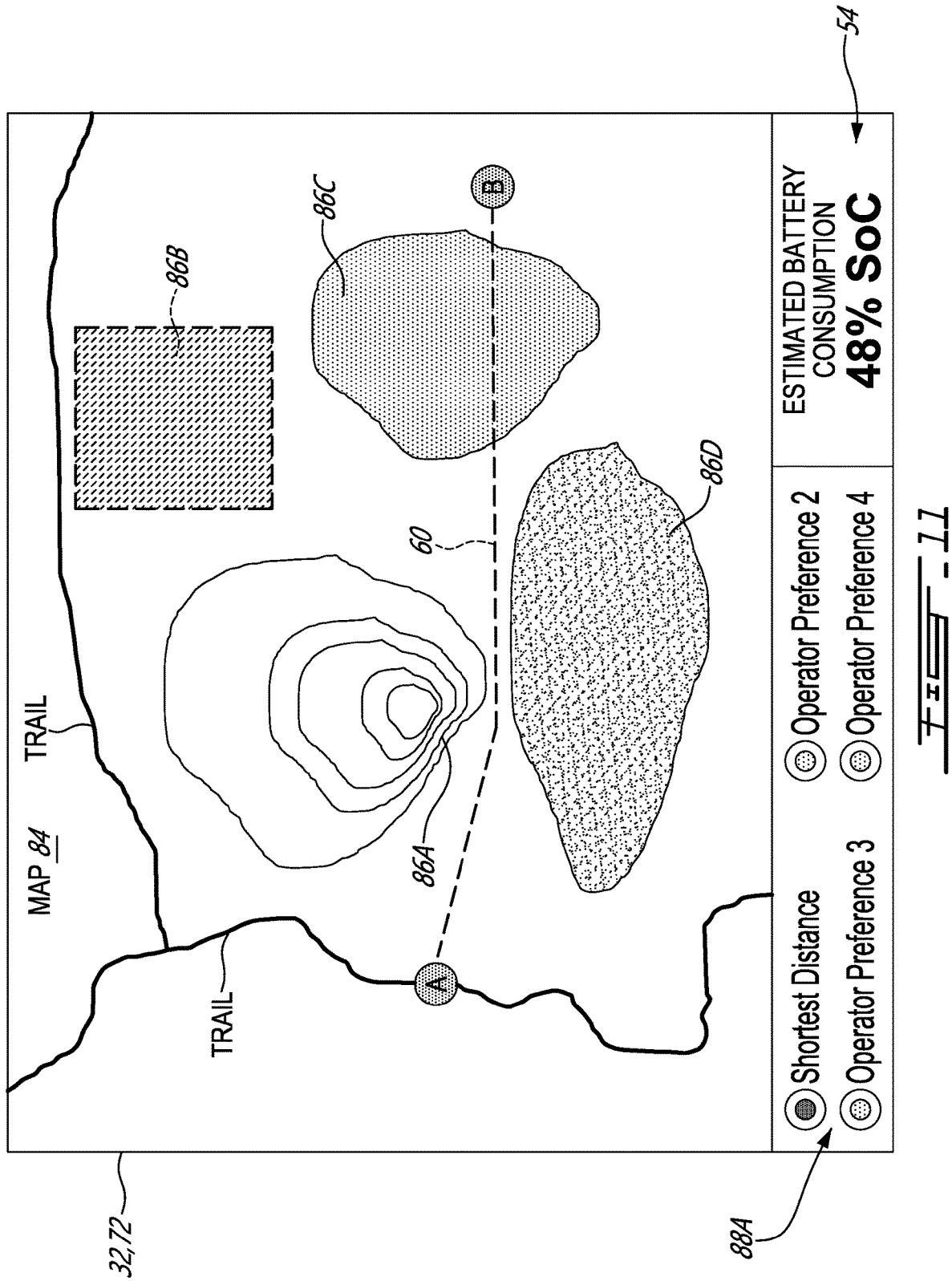
FIG. 11 is another illustration of the operator interface for facilitating the determination of the computer-defined path of the uncharted off-road route.

FIG. 11 is an illustration of another exemplary representation of map 84 displayed on operator interface 32, 72 for facilitating the determination of the computer-defined path of uncharted route 60. In this example, map 84 shows a plurality of obstacles 86 including cliff 86A, private property 86B surrounded by a fence, frozen lake 86C and dense forest 86D. Operator interface 32, 72 shows preference 88A (shortest distance) as being selected, and map 84 correspondingly shows uncharted route 60 extending between starting point A and destination B. Uncharted route 60 is shown to extend between cliff 86A and dense forest 86D and also extend over lake 86C, which is frozen with an ice thickness that is sufficient to safely support vehicle 10. Uncharted route 60 as shown in FIG. 11 is determined to have an estimated battery consumption 54 of 48% SoC of battery 26.

Figure 12:
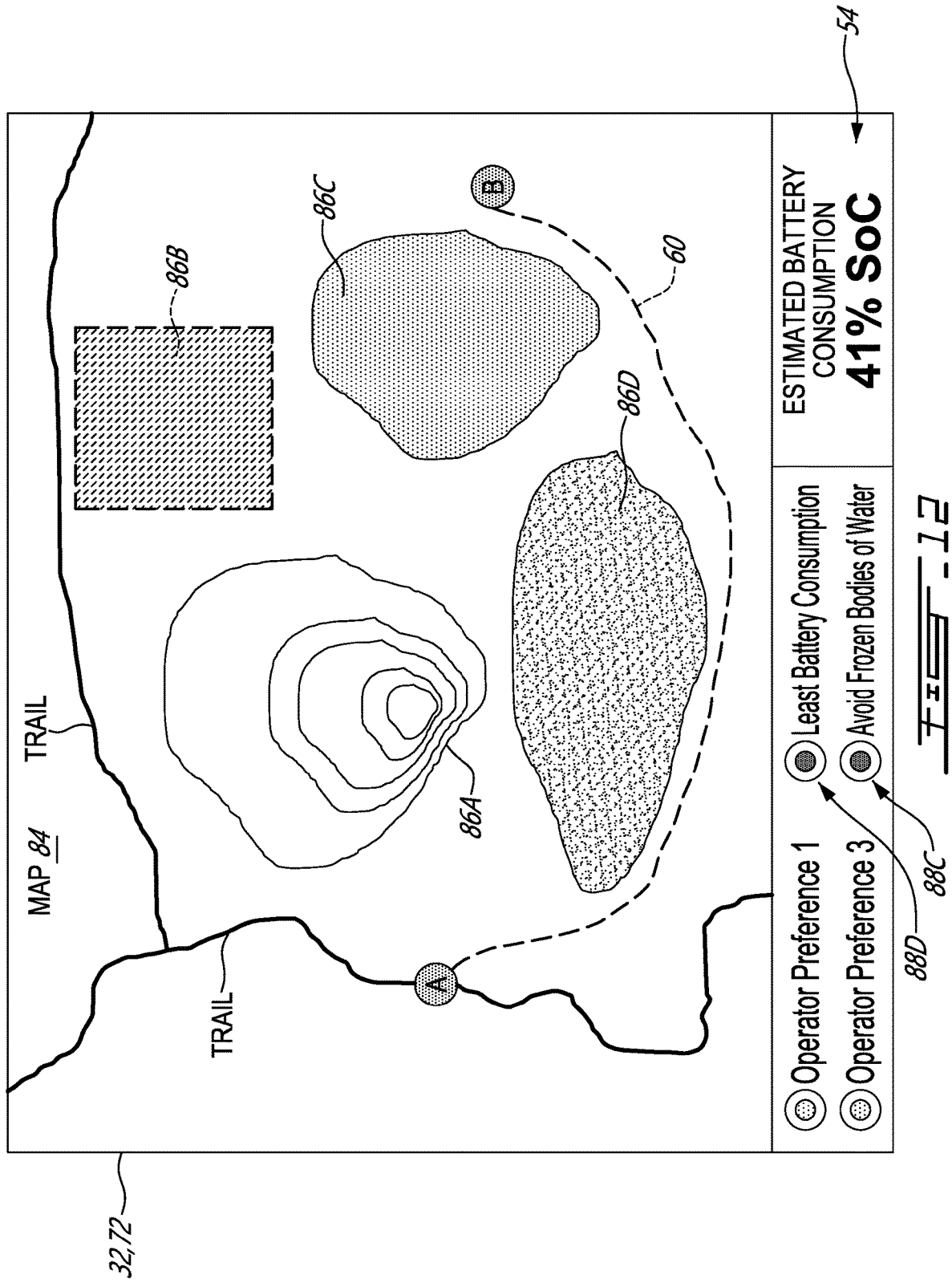
FIG. 12 is another illustration of the operator interface facilitating the determination of the computer-defined path of the uncharted off-road route.

FIG. 12 is an illustration of another exemplary representation of map 84 displayed on operator interface 32, 72 for facilitating the determination of the computer-defined path of uncharted route 60. In this example, map 84 shows the same plurality of obstacles 86 as shown in FIG. 11. Operator interface 32, 72 shows preference 88D (least battery consumption) and preference 88C (avoid frozen bodies of water) as both being selected, and map 84 correspondingly shows uncharted route 60 extending between starting point A and destination B. Uncharted route 60 is shown to extend to the lower side of dense forest 86D and also to the lower side of lake 86C. Uncharted route 60 may be selected to minimize increases in elevation to promote a reduced estimated battery consumption 54. Uncharted route 60 may also be selected to traverse terrain conditions that are more favorable to reduced estimated battery consumption 54. Uncharted route 60 as shown in FIG. 12 is determined to have an estimated battery consumption 54 of 41% SoC of battery 26.

Figure 13:
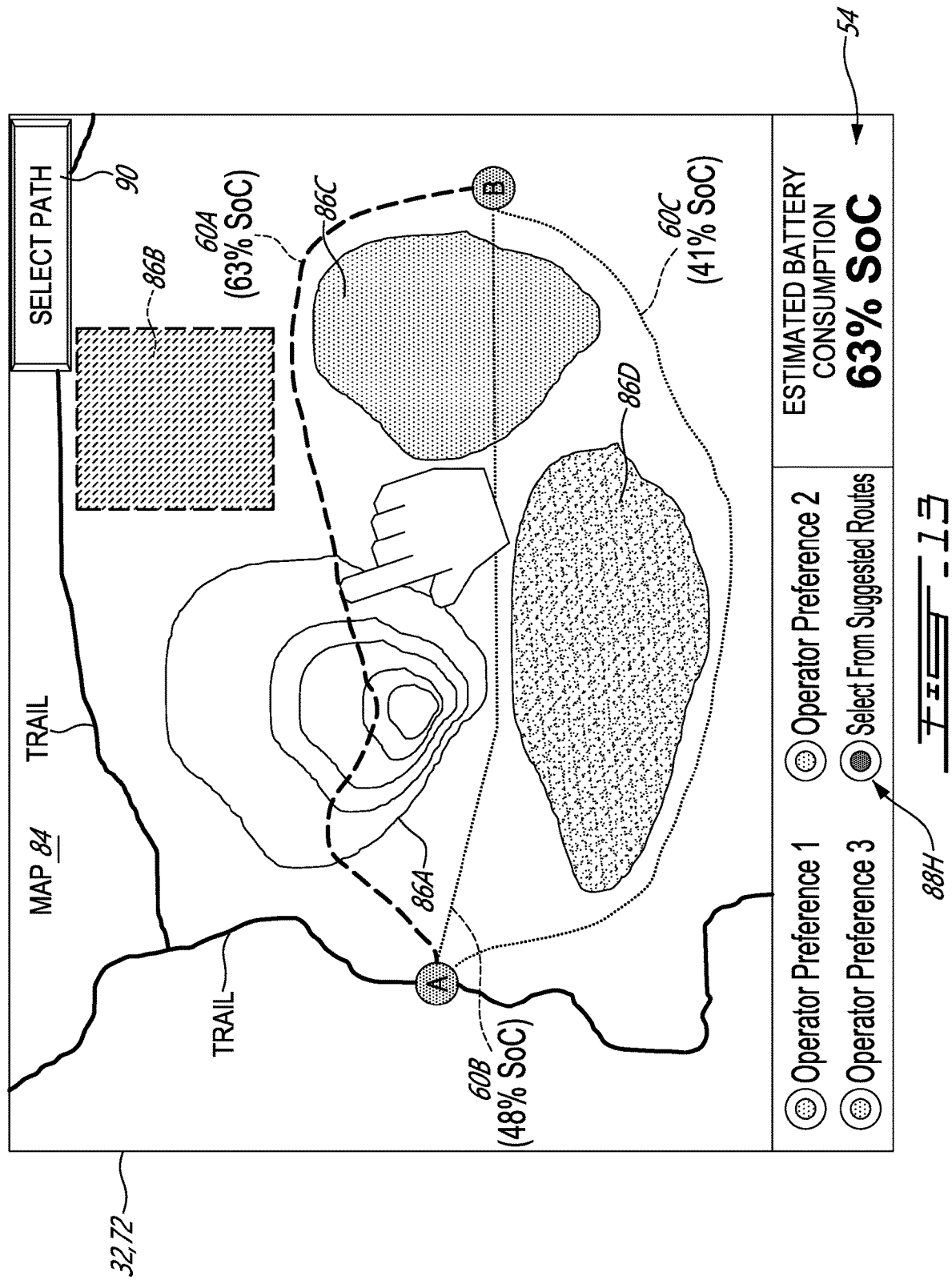
FIG. 13 is another illustration of the operator interface facilitating the determination of the computer-defined path of the uncharted off-road route.

FIG. 13 is an illustration of another exemplary representation of map 84 displayed on operator interface 32, 72 for facilitating the determination of the computer-defined path of uncharted route 60. In this example, map 84 shows the same plurality of obstacles 86 as shown in FIG. 11. Operator interface 32, 72 shows preference 88H (operator to select from suggested routes) and map 84 correspondingly shows three potential computer-generated paths 60A, 60B and 60C extending between starting point A and destination B for uncharted route 60. Each potential path 60A, 60B and 60C may have its own estimated battery consumption 54 associated therewith. FIG. 13 shows a finger of the operator having pre-selected (e.g., highlighted) first potential path 60A and operator interface 32, 72 correspondingly shows estimated battery consumption 54 of 63% SoC of battery 26 being associated with first potential path 60A. Alternatively, the operator may pre-select second potential path 60B or third potential path 60C to see the corresponding estimated battery consumption 54 associated with each potential path 60A, 60B, 60C. The display of estimated battery consumption 54 associated with each potential path 60A, 60B, 60C may assist the operator in selecting the desired and/or most suitable potential path 60A, 60B, 60C as uncharted route 60 to be travelled by vehicle 10. Map 84 shows second potential path 60B as having an estimated battery consumption of 48% SoC of battery 26. Map 84 shows third potential path 60C as having an estimated battery consumption of 41% SoC of battery 26. Once the operator is ready to select one of the suggested potential paths 60A, 60B, 60C, the operator may then choose/press button 90 to select first potential path 60A that has been pre-selected by the operator. First potential path 60A may then be used for uncharted route 60 to be travelled by vehicle 10. The pre-selection of first potential path 60A may cause first potential path 60A to be visually distinguished from second potential path 60B and from third potential path 60C to visually indicate the pre-selection to the operator. Once first potential path 60A has been selected by a user, by pressing button 90 for example, the visual display of second potential path 60B and third path 60C may disappear.

In reference to potential paths 60A, 60B, 60C having different estimated battery consumptions 54 shown in FIG. 13, preference 88E (complete with current SoC) may be specified to allow method 1000 to automatically select the appropriate path, or to suggest only potential paths that meet preference 88E. For example, if current battery SoC 50 is greater than 63%, then all three potential paths 60A, 60B, 60C may be shown on operator interface 32, 72 and be available for the operator to select from. If current battery SoC 50 is 55%, then only second potential path 60B and third potential path 60C may be shown on operator interface 32, 72 and be available for the operator to select from. If current battery SoC 50 is only 45% (i.e., too low to complete first potential path 60A or second potential path 60B), then third potential path 60C may be the only option available, and method 1000 may automatically select third potential path 60C to be used for uncharted route 60 to be travelled by vehicle 10.

Figure 14:
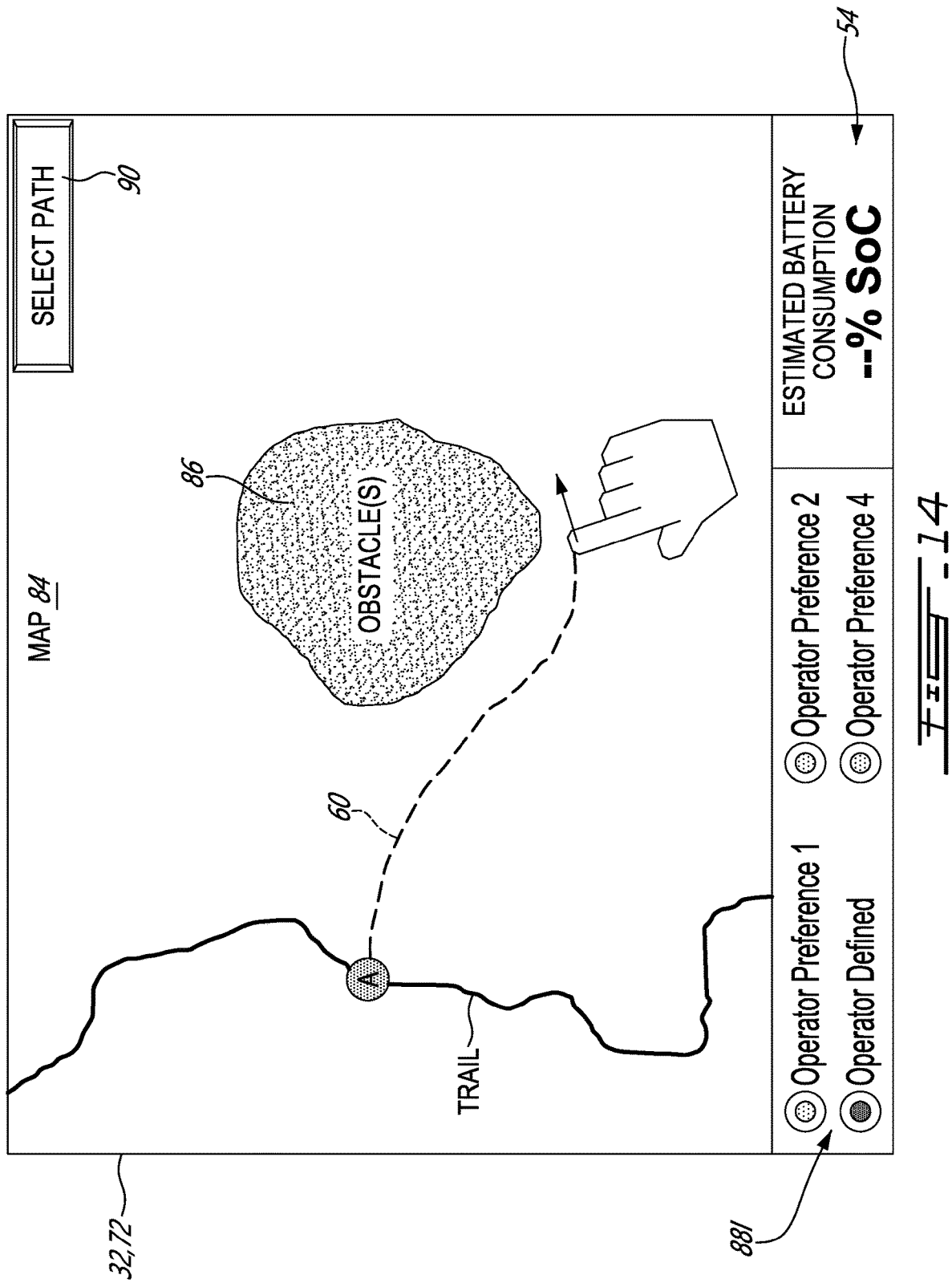
FIG. 14 is an illustration of an exemplary operator interface for facilitating the determination of an operator-defined path of the uncharted off-road route.

FIG. 14 is an illustration of another exemplary representation of map 84 displayed on operator interface 32, 72 for facilitating the determination of the operator-defined path of uncharted route 60. In this example, map 84 shows the same obstacle(s) 86 as shown in FIG. 8. Operator interface 32, 72 shows preference 88I (operator defined) as being selected. The display of obstacle(s) 86 on map 84 may assist the operator in defining a suitable path for uncharted route 60 that avoids obstacle(s) 86. FIG. 14 shows a finger of the operator being slid on a touch-sensitive display device of operator interface 32, 72 for tracing a desired path over map 84. Alternatively, the operator-defined path of uncharted route 60 may be defined by the entry of spaced apart waypoints via the touch-sensitive display device and/or via a numeric keypad. Since the operator has not yet completed the definition of uncharted route 60 in FIG. 14 (i.e., destination B not yet being defined), estimated battery consumption 54 is shown as also not being determined.

In some embodiments, the operator may iteratively define potential paths until a path having a satisfactory estimated battery consumption 54 (and potentially other satisfactory parameters) for uncharted route 60 has been found. The operator may then choose/press button 90 to select the operator-defined path as uncharted route 60 to be travelled by vehicle 10.

One of the attractions to off-road vehicles is that they are not confined to travelling along defined paths; an operator has the freedom to deviate from a planned route. In situations where an operator chooses to deviate from a planned uncharted route (either operator-defined or computer-defined), the estimated battery consumption 54 may be automatically revised based on GPS data and also based on predetermined battery consumption data associated with operating conditions and geographic characteristics for a length of route segment that will return the operator back to the planned uncharted route. While travelling along an unplanned uncharted route segment, the operator may be alerted to the effect that the accuracy of estimated battery consumption 54 may be affected by the deviation from the planned uncharted route.

In an alternative example, when vehicle 10 is travelling along an unplanned uncharted route that deviates from the planned uncharted route, revising of the battery consumption data may be paused until vehicle 10 returns to the planned uncharted route. In some embodiments, the communication of estimated battery consumption data 54 to the operator may be ceased while travelling along the unplanned uncharted route. In some embodiments, the operator may be alerted that estimated battery consumption data 54 is not available while travelling along the unplanned uncharted route. The determination of whether vehicle 10 is on a known or unknown route segment may be made using GPS and map data for example.

Figure 15:
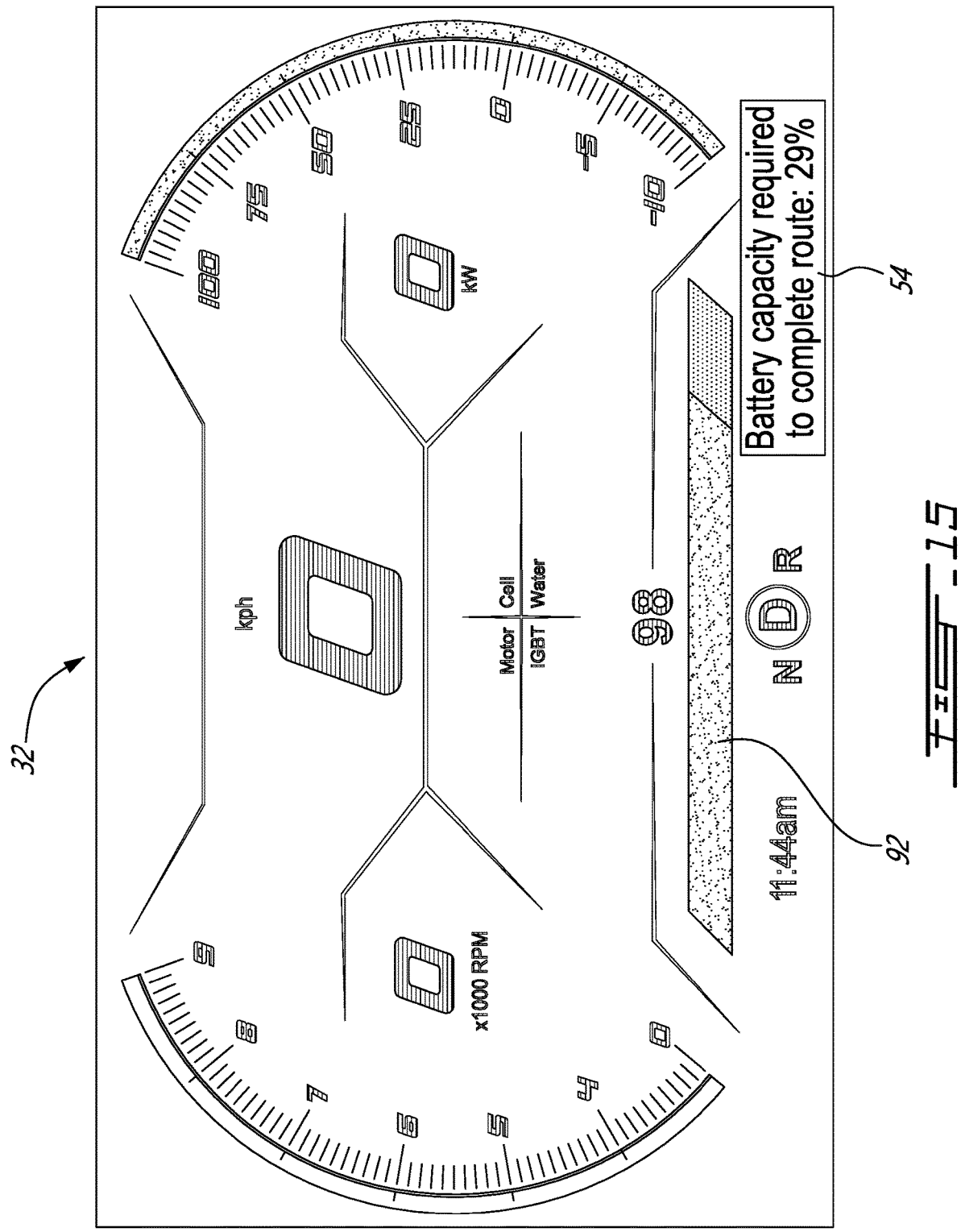
FIG. 15 is an illustration of an exemplary instrument panel of the electric off-road vehicle.

FIG. 15 is an illustration of an exemplary onboard operator interface 32 which may be part of vehicle 10. Onboard operator interface 32 may include an instrument panel including a display device capable of displaying a speedometer and other instrumentation in the form of one or more digital readouts and/or analog gauges. Onboard operator interface 32 may indicate estimated battery consumption 54 (e.g., expressed in SoC (%)) expected to complete uncharted route 60. Onboard operator interface 32 may also include indication 92 (e.g., progress bar) indicative of a current SoC 50 of battery 26 of vehicle 10. Estimated battery consumption 54 and indication 92 may be displayed in a textual or graphical manner.

In some embodiments, estimated battery consumption 54 may be updated (e.g., in real time) based on actual battery consumption 52 as vehicle 10 is travelling along uncharted route 60. Accordingly, estimated battery consumption 54 may be updated in a manner that efficiently takes into account various operating conditions that can affect battery range such as operator driving habits, ambient temperature, terrain (e.g., snow) conditions, changes in elevation, and the weight carried by vehicle 10 for example. If actual battery consumption 52 over a portion of uncharted route 60 differs from what was expected, such difference may require estimated battery consumption 54 for the remainder of uncharted route 60 to be revised. For example, as vehicle 10 is travelling uncharted route 60, the actual discharge rate of battery 26 over a portion of uncharted route 60 may be greater or lower than the estimated expected discharge rate of battery 26 by some difference (e.g., +/−5%) for the same portion of uncharted route 60. In such situation, the original estimated battery consumption 54 for the remainder of uncharted route 60 may be used as a baseline to which the difference (e.g., +/−5%) may be added or subtracted from in order to provide a revised estimated battery consumption 54 for the remainder of uncharted route 60. Such difference between actual and estimated battery consumption 54 may be due to different operating conditions and/or driving habits than those (if any) used to generate the original estimated battery consumption 54.

During operation of vehicle 10, the operator may be provided with estimated battery consumption 54 and indication 92, which may, in some situations: (1) provide peace of mind to the operator regarding the ability to reach destination B with the current battery charge; (2) help the operator decide when to recharge battery 26; (3) help the operator decide whether or not to turn around; and/or (4) help the operator decide whether or not to change their driving habits to reduce battery consumption. Estimated battery consumption 54 and indication 92 may also be provided on external operator interface 72 to help the operator during trip planning.

FIG. 16 is an illustration of an exemplary operator interface 32, 72 providing navigation display 94 for guiding the operator along uncharted route 60. Navigation display 94 may be provided on onboard operator interface 32 or on external operator interface 72, which may include a portable electronic device carried by the operator or mounted to handlebar 24 during operation of vehicle 10. Using navigation display 94, method 1000 may receive an identification of a current location of vehicle 10 determined using GPS receiver 58, and use the current location of vehicle 10 to guide the operator of vehicle 10 along uncharted route 60. Method 1000 may generate one or more outputs causing guidance instructions to be communicated to the operator. Such guidance instructions may be visual instructions displayed on navigation display 94.

Navigation display 94 may show icon 96 representing vehicle 10 and a portion of map 84 ahead of vehicle 10 including a portion of uncharted route 60. In some embodiments, the position of vehicle 10 relative to uncharted route 60 may be shown. The portion of map 84 shown may dynamically change as vehicle 10 travels along (or away from) uncharted route 60. In some embodiments, navigation display 94 may show obstacle(s) 86. In some embodiments, navigation display 94 may show guidance instructions to the operator regarding upcoming turns or other features of uncharted route 60. Alternatively or in addition, such guidance instructions may be aural. In some embodiments, navigation display 94 may indicate an estimated time to reach destination B. In some embodiments, navigation display 94 may indicate estimated battery consumption 54 to reach destination B.

As can be seen therefore, the examples described above and illustrated are intended to be exemplary only.

What is claimed is:

1. A computer-implemented method facilitating travel of an electric off-road vehicle on an uncharted off-road route, the method comprising:
   receiving, via an operator interface, a digital definition of the uncharted off-road route to be travelled by the electric off-road vehicle;
   at a computer in data communication with the operator interface:
      accessing digital map data of a geographic area overlaid by the uncharted off-road route, the uncharted off-road route being undefined on a trail map of the map data;
      assigning one or more geographic characteristics extracted from the map data to the uncharted off-road route; and
      determining, using the one or more geographic characteristics assigned to the uncharted off-road route and predetermined battery consumption data associated with the one or more geographic characteristics, an estimated battery consumption for the electric off-road vehicle to travel the uncharted off-road route;
   communicating, via the operator interface, the estimated battery consumption to an operator of the electric off-road vehicle;
   as the electric off-road vehicle travels along the uncharted off-road route:
      using a global positioning system receiver to determine a current location of the electric off-road vehicle; and
      based on the current location of the electric off-road vehicle, causing the operator interface to provide a revised estimated battery consumption for a remainder of the uncharted off-road route.

2. The computer-implemented method as defined in claim 1, comprising:
   receiving, via the operator interface, an identification of a starting location for the electric off-road vehicle and an identification of a destination for the electric off-road vehicle;
   determining, at the computer and using the map data, a path of the uncharted off-road route between the starting location and the destination, the map data defining one or more obstacles for the electric off-road vehicle, the uncharted off-road route avoiding the one or more obstacles; and
   communicating, via the operator interface, the uncharted off-road route to the operator of the electric off-road vehicle.

3. The computer-implemented method as defined in claim 2, wherein the one or more obstacles include one or more of the following: an incline, a decline, a body of water, and a forest.

4. The computer-implemented method as defined in claim 2, wherein:
   determining the path of the uncharted off-road route includes:
      determining a first potential path between the starting location and the destination; and
      determining a second potential path between the starting location and the destination; and
   the method includes:
      receiving, via the operator interface, a preference for the first potential path over the second potential path; and
      selecting, at the computer, the first potential path for the uncharted off-road route to be travelled by the electric off-road vehicle.

5. The computer-implemented method as defined in claim 4, wherein:
   the estimated battery consumption is a first estimated battery consumption required for the electric off-road vehicle to complete the first potential path;
   a second estimated battery consumption greater than the first estimated battery consumption is required for the electric off-road vehicle to complete the second potential path; and
   the preference is indicative of a least battery consumption to complete the uncharted off-road route.

6. The computer-implemented method as defined in claim 4, wherein:
   the estimated battery consumption is a first estimated battery consumption required for the electric off-road vehicle to complete the first potential path;
   a second estimated battery consumption greater than the first estimated battery consumption is required for the electric off-road vehicle to complete the second potential path;
   the preference is indicative of a desire to complete the uncharted off-road route with a current state of charge (SoC) of a motoring battery of the electric off-road vehicle;
   the method includes:
      receiving the current SoC of the motoring battery of the electric off-road vehicle;
      determining that the first estimated battery consumption is lower than the current SoC; and
      determining that the second estimated battery consumption is greater than the current SoC.

7. The computer-implemented method as defined in claim 4, wherein:
   the first potential path includes a first change in elevation;
   the second potential path includes a second change in elevation different from the first change in elevation; and
   the preference is for the first change in elevation of the first potential path.

8. The computer-implemented method as defined in claim 1, wherein the uncharted off-road route includes an operator-defined path between a starting location and a destination for the electric off-road vehicle.

9. The computer-implemented method as defined in claim 1, wherein the uncharted off-road route includes a computer-defined path between a starting location and a destination for the electric off-road vehicle.

10. The computer-implemented method as defined in claim 1, comprising
    using the current location of the electric off-road vehicle, causing a navigation display to display visual instructions guiding the operator of the electric off-road vehicle along the uncharted off-road route as the electric off-road vehicle travels along the uncharted off-road route.

11. The computer-implemented method as defined in claim 1, wherein when the electric off-road vehicle is travelling on the uncharted off-road route, determining, at the computer, the revised estimated battery consumption for the remainder of the uncharted off-road route based on an actual battery consumption of the electric off-road vehicle.

12. The computer-implemented method as defined in claim 1, wherein the one or more geographic characteristics of the uncharted off-road route include a change in elevation over a segment of the uncharted off-road route.

13. The computer-implemented method as defined in claim 1, wherein the one or more geographic characteristics of the uncharted off-road route include a terrain condition over a segment of the uncharted off-road route.

14. The computer-implemented method as defined in claim 1, wherein the predetermined battery consumption data is based on historical battery consumption data recorded from previous travel on one or more routes other than the uncharted off-road route.

15. A system facilitating travel of an electric off-road vehicle on an uncharted off-road route, the system comprising:
an operator interface operable to receive a definition of the uncharted off-road route to be travelled by the electric off-road vehicle;
a global positioning system receiver operable to determine a current location of the electric off-road vehicle;
one or more data processors operatively connected to the operator interface and to the global positioning system receiver; and
non-transitory machine-readable memory storing:
map data of a geographic area overlaid by the uncharted off-road route, the uncharted off-road route being undefined on a trail map of the map data;
predetermined battery consumption data; and
instructions executable by the one or more data processors and configured to cause the one or more data processors to:
using the map data, assign one or more geographic characteristics extracted from the map data to the uncharted off-road route;
relate the one or more geographic characteristics to the predetermined battery consumption data;
determine, using the predetermined battery consumption data, an estimated battery consumption for the electric off-road vehicle to travel the uncharted off-road route;
cause the operator interface to output the estimated battery consumption; and
based on the current location of the electric off-road vehicle determined using the global positioning system receiver, cause the operator interface to provide a revised estimated battery consumption for a remainder of the uncharted off-road route as the electric off-road vehicle travels along the uncharted off-road route.

16. The system as defined in claim 15, wherein:
the map data defines one or more obstacles for the electric off-road vehicle; and
the instructions are configured to cause the one or more data processors to:
use an identification of a starting location for the electric off-road vehicle, an identification of a destination for the electric off-road vehicle, and the map data to determine a path of the uncharted off-road route between the starting location and the destination, the uncharted off-road route avoiding the one or more obstacles; and
cause the uncharted off-road route to be communicated to the operator of the electric off-road vehicle via the operator interface.

17. The system as defined in claim 16, wherein:
determining the path of the uncharted off-road route includes:
determining a first potential path between the starting location and the destination; and
determining a second potential path between the starting location and the destination; and
the instructions are configured to cause the one or more data processors to, using a preference for the first potential path over the second potential path, select the first potential path as the uncharted off-road route to be travelled by the electric off-road vehicle.

18. The system as defined in claim 15, wherein the predetermined battery consumption data is based on historical battery consumption data recorded from previous travel on one or more routes other than the uncharted off-road route.

19. An electric snowmobile comprising:
a motoring battery;
an electric motor for propelling the electric snowmobile, the electric motor being operatively connected to be driven by electric power from the motoring battery;
an operator interface; and
one or more controllers operatively connected to the operator interface, the one or more controllers being configured to:
relate an uncharted off-road route to be travelled by the electric snowmobile to map data of a geographic area overlaid by the uncharted off-road route, the uncharted off-road route being undefined on a trail map of the map data;
determine, using the map data, one or more geographic characteristics of the uncharted off-road route;
relate the one or more geographic characteristics to predetermined battery consumption data;
determine, using the predetermined battery consumption data, an estimated battery consumption for the electric snowmobile to travel the uncharted off-road route; and
cause the estimated battery consumption to be communicated to an operator of the electric snowmobile via the operator interface.

20. The electric snowmobile as defined in claim 19, comprising a satellite positioning system receiver operatively connected to the one or more controllers, wherein the one or more controllers are configured to, using a current location of the electric snowmobile determined using the satellite positioning system receiver, cause the operator interface to guide the operator of the electric snowmobile along the uncharted off-road route.

* * * * *